(12) United States Patent
Pomerance

(10) Patent No.: US 7,343,295 B2
(45) Date of Patent: Mar. 11, 2008

(54) AUTOMATED COMPLAINT RESOLUTION SYSTEM

(76) Inventor: Brenda Pomerance, 260 W. 52 St. Apt. 27B, New York, NY (US) 10019

( * ) Notice: Subject to any disclaimer, the term of this patent is extended or adjusted under 35 U.S.C. 154(b) by 1375 days.

(21) Appl. No.: 09/793,687

(22) Filed: Feb. 26, 2001

(65) Prior Publication Data

US 2002/0010591 A1     Jan. 24, 2002

Related U.S. Application Data

(63) Continuation-in-part of application No. 09/543,049, filed on Apr. 5, 2000.

(60) Provisional application No. 60/216,222, filed on Jul. 5, 2000, provisional application No. 60/203,705, filed on May 11, 2000.

(51) Int. Cl.
*G06Q 99/00* (2006.01)
*H04K 1/00* (2006.01)

(52) U.S. Cl. .............................. 705/1; 705/80

(58) Field of Classification Search ................ 705/10, 705/36, 27, 80, 1, 26
See application file for complete search history.

(56) References Cited

U.S. PATENT DOCUMENTS

| | | | |
|---|---|---|---|
| 5,495,412 A | 2/1996 | Thiessen | |
| 5,668,953 A | 9/1997 | Sloo | |
| 5,826,250 A | 10/1998 | Trefler | |
| 5,895,450 A * | 4/1999 | Sloo | 705/1 |
| 5,956,687 A | 9/1999 | Wamsley | |

(Continued)

FOREIGN PATENT DOCUMENTS

JP     2003114927    * 10/2001

OTHER PUBLICATIONS

Online Mediation Offered for Resolving E-Commerce Disputes, Press Release, Online Resolution, Mar. 23, 2000.*

(Continued)

*Primary Examiner*—Jan Mooneyham
(74) *Attorney, Agent, or Firm*—Brenda Pomerance

(57) ABSTRACT

A complaint resolution system, also referred to as a disputes system, enables registered consumers to file a complaint against a merchant. During complaint preparation, the disputes system advises the consumer of relevant cases and other information, allows the consumer to vent their emotions, and prepares a well-formed complaint on behalf of the consumer. After the consumer approves filing of the complaint, the complaint is compared with the merchant's stored business rules. If the merchant's solution for the problem and the consumer's desired solution match, then the disputes system automatically forms an agreement. The disputes system monitors compliance with the agreement by the merchant and consumer. If the merchant has specified a business rule for the problem, but the merchant's solution for the problem and the consumer's desired solution differ, then the disputes system initiates automated mediation, automatically preparing an Answer comprising the solution from the merchant's business rule as the merchant's starting negotiating position. If the merchant has not specified a business rule for the consumer's problem, then the disputes system initiates automated mediation, asking the merchant for his or her Answer to the consumer's complaint. During processing of the consumer's complaint, the disputes system maintains and updates a detailed case record. At the conclusion of the case, the disputes system automatically prepares an anonymized case summary, and adds the anonymized case summary to a database of anonymized case summaries.

19 Claims, 10 Drawing Sheets

U.S. PATENT DOCUMENTS

| | | | |
|---|---|---|---|
| 6,035,288 A * | 3/2000 | Solomon | 705/37 |
| 6,177,932 B1 | 1/2001 | Galdes et al. | |
| 6,330,551 B1 * | 12/2001 | Burchetta et al. | 705/80 |
| 2001/0007106 A1 * | 7/2001 | Slaikeu | 707/1 |

OTHER PUBLICATIONS

Eisen, Joel, "Are We Ready for Mediation in Cyberspace", Brigham Young University Law Review 1998.*
Vignette Press Release, Apr. 11, 2000 (one page).
Brightware Answer/Classify Product, Oct. 1999 (three pages).
Echomail XIVA technology, www.interactive.com/flash/products/technology.html (one page).
Kana Classify, Feb. 2000 (two pages).
Card Systems eCardSMART Exceptions Management System Press Release, Feb. 9, 2000 (two pages).
www.onlinemediators.com, printed Apr. 3, 2000 (eight pages).
www.squaretrade.com, printed Apr. 18, 2000 (two pages).
American Express, Online Merchant Services, Resolve Disputes, printed Apr. 23, 2000 (one page).
www.ugetheard.com, printed May 3, 2000 (eight pages).
Press release for Virtual Magistrate project, Mar. 4 1996, http://cypherpunks.venona.com/data/1996/03/msg00592.html, 4 pages.
icourthouse we pages: Be A Juror, Rules of Procedure, Press Release dated Nov. 8, 1999, total of 5 pages, printed Mar. 16, 2001.
Katsh, Ethan and Rifkin, Janet, *Online Dispute Resolution*, Jossey-Bass, 2001, pp. 54-57, 106-107.

* cited by examiner

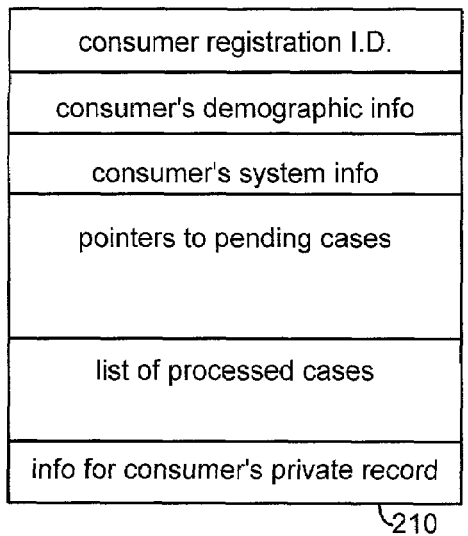
FIG. 3B
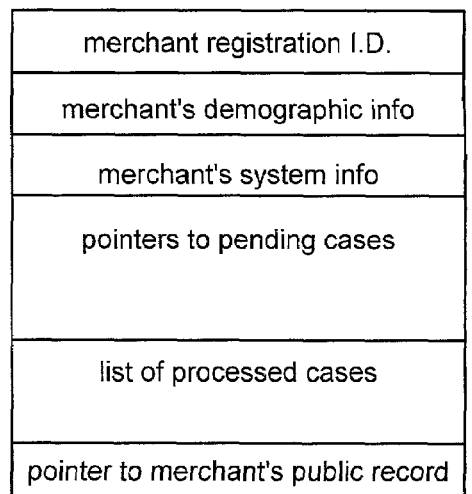
FIG. 4B
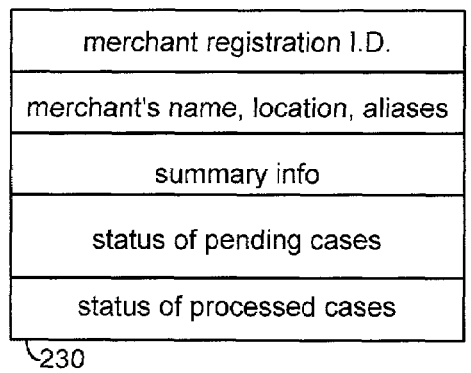
FIG. 4C
if (PROBLEM_TYPE [& PROBLEM_PARAM])
then (SOLUTION_TYPE [& SOLUTION_PARAM])
FIG. 4D

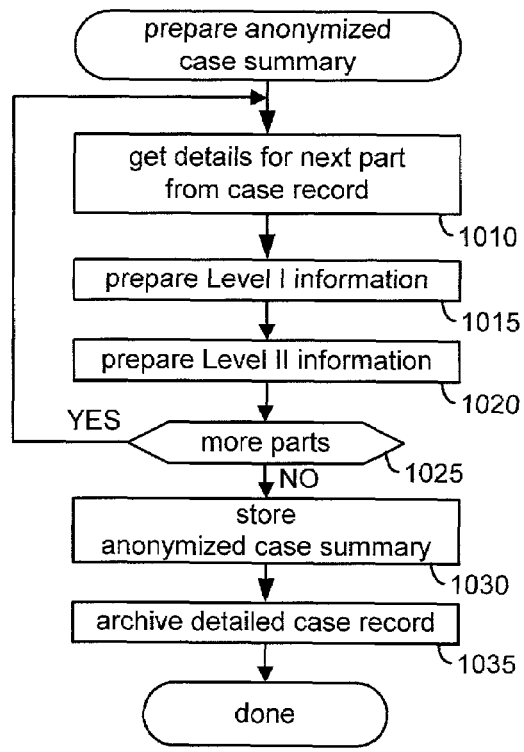

CASE RECORD

| case ID no. | filing date |
|---|---|
| consumer registration ID ||
| merchant registration ID ||
| complaint info ||
| business rules & affiliated org. rules at start of case ||
| system version used for processing ||
| procedural history, datestamped ||
| attachments: messages exchanged documents uploaded ||

ANONYMIZED CASE SUMMARY

| case ID no. | 1075 |
|---|---|
| Part 1 { consumer demographics, Level I ||
| consumer demographics, Level II ||
| Part 2 { merchant demographics, Level I ||
| merchant demographics, Level II ||
| Part 3 { procedural history, Level I ||
| procedural history, Level II ||
| Part 4 { resolution description, Level I ||
| resolution description, Level II ||

AUTOMATED COMPLAINT RESOLUTION SYSTEM

The present application is a continuation-in-part of U.S. application Ser. No. 09/543,049, filed Apr. 5, 2000; U.S. provisional application Ser. No. 60/203,705, filed May 11, 2000; and U.S. provisional application Ser. No. 60/216,222, filed Jul. 5, 2000; the disclosure of each of these applications is hereby incorporated by reference.

BACKGROUND OF THE INVENTION

The present invention relates to automated dispute resolution, and more particularly, is directed to automated resolution of a complaint from a complainer against a party.

Credit card associations have procedures for resolving payment disputes. Due to the large volume of payment disputes, the procedures have been largely automated. Typically, a call center representative obtains payment dispute details from a cardholder via a telephone conversation, then enters the payment dispute details into a computer workstation.

The details of the dispute are compared by a computer system against automated rules for resolving disputes. If necessary to resolve the dispute, additional information is sought from the merchant involved in the dispute with the cardholder. Usually, the computer system recommends a resolution to a human staff member at the cardholder's issuing institution, and the human endorses the resolution; in many cases, the human endorsement is bypassed so that the computer system resolves the dispute without human aid.

The credit card association dispute resolution procedure is an arbitration, as a third party, i.e., not the cardholder or merchant, makes a decision that resolves the dispute. In many disputes, the third party performing the arbitration is a computer system.

If either the cardholder or the merchant is unhappy with the resolution of the dispute, and certain requirements are met, such as the dispute having at least a particular dollar value, then the dispute proceeds to human-directed arbitration.

The credit card dispute resolution process is available only when a credit card was used for payment. Furthermore, the cost of the dispute resolution process is very high, due to costs incurred when the cardholder's issuing institution and the merchant's acquiring institution are brought into a dispute between the cardholder and merchant. The cardholder is supposed to invoke the credit card dispute resolution process only after attempting to directly resolve the dispute with the merchant, but in many cases the direct resolution attempt does not occur because the merchant is not readily accessible or the cardholder wishes to avoid a direct confrontation with the merchant. Thus, the credit card dispute resolution process, while inefficient, is used when available because the alternative, cardholders fending for themselves, is worse.

Online dispute resolution services exist, but all of these services use a human as the third party directing the conflict resolution. For example, a large auction site recommends that dissatisfied bidders use a particular one of these dispute resolution services. The dispute resolution service has a first fully automated phase, in which the dispute resolution service acts as a message switch facilitating direct negotiation by e-mail between buyers and sellers, and a second human-directed phase, in which a trained mediator mediates resolution of the dispute between the buyer and the seller.

In arbitration, the third party decides the dispute, whereas in mediation, decision making authority remains with the principals involved in the dispute and the third party helps the principals to reach an agreement.

The online dispute resolution services are all fairly expensive, as a trained human is involved in resolving each dispute. Furthermore, when a human is involved, delays are inevitable.

Shipping companies have recently introduced systems to make the return shipping channel more efficient. Usually, a merchant decides when return shipping is authorized, and the shipping company enables the merchant or the merchant's customer to locally print a return shipping label; this is particularly convenient for the customer when the merchant's account is used to pay for the return shipping. However, each merchant decides how to best employ the shipping company services, that is, the shipping companies specify the procedure for reverse shipping, but not the rules governing how reverse shipping is authorized.

Other online services exist for helping parties decide the monetary value of a settlement to a conflict. A typical scenario involves a party having a claim against an insurance company. The claimant and the insurance company each provide a series of settlement amounts, in confidence, to a computer system, and the computer system uses an algorithm to computer the settlement amount, if any. These services are useful when the only item being disputed is the dollar amount of the settlement.

Accordingly, there is room for improving the efficiency of dispute resolution.

SUMMARY OF THE INVENTION

In accordance with an aspect of this invention, there is provided a method for automated resolution of a complaint from a complainer against a party. Lack of agreement is detected between the complainer and the party, and then automated mediation occurs between the complainer and the party to resolve the complaint, the mediation occurring without a human mediator.

During preparation of the complaint, relevant contextual information may be presented to the complainer. Based on information previously supplied by the party, what information is needed to detect lack of agreement may be automatically determined, and the needed information may then be automatically collected. A summary of processing of the complaint may be automatically prepared, the summary being anonymized and having at least two levels of information granularity.

In accordance with another aspect of this invention, there is provided a method for automated resolution of a complaint from a complainer against a party. Emotional detail information is automatically collected, and emotional state information for the complaint is automatically generated from the emotional detail information. The complaint is automatically compared with rules previously supplied by the party to detect whether there is a match between a solution desired by the complainer and solutions that the party agrees to.

In accordance with a further aspect of this invention, there is provided a method for automated resolution of a complaint from a complainer against a party. The complaint is automatically collected from the complainer, and when the complaint's desired solution does not match acceptable solutions specified in rules of the party, a complaint resolution offer is automatically generated on behalf of the party based on the acceptable solutions specified in the rules of the party.

In accordance with yet another aspect of this invention, there is provided a method for automated resolution of a complaint from a complainer against a party. An agreement resolving the complaint is obtained. Compliance by at least one of the complainer and the party with terms of the agreement is automatically monitored.

The compliance monitoring may include receiving compliance information from at least one of the complainer and the party, or receiving compliance information from an external source.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 3B is a chart illustrating consumer registration record 210;

FIG. 4B is a chart illustrating merchant registration record 220;

FIG. 4C is a chart illustrating merchant public record 230;

FIG. 4D is a chart illustrating a business rule template;

FIG. 10A is a flowchart depicting the preparing an anonymized case summary portion of the operation process of FIG. 5;

FIG. 10B is a chart depicting detailed case record 1050; and

FIG. 10C is a chart depicting anonymized case summary 1075.

DETAILED DESCRIPTION OF THE PREFERRED EMBODIMENTS

A complaint resolution system, also referred to as a disputes system, enables registered consumers to file a complaint against a merchant. During complaint preparation, the disputes system advises the consumer of relevant cases and other information, allows the consumer to vent their emotions, and prepares a well-formed complaint on behalf of the consumer. After the consumer approves filing of the complaint, the complaint is compared with the merchant's stored business rules. If the merchant's solution for the problem and the consumer's desired solution match, then the disputes system automatically forms an agreement. The disputes system monitors compliance with the agreement by the merchant and consumer.

If the merchant has specified a business rule for the problem, but the merchant's solution for the problem and the consumer's desired solution differ, then the disputes system initiates automated mediation, automatically preparing an Answer comprising the solution from the merchant's business rule as the merchant's starting negotiating position.

If the merchant has not specified a business rule for the consumer's problem, then the disputes system initiates automated mediation, asking the merchant for his or her Answer to the consumer's complaint.

During processing of the consumer's complaint, the disputes system maintains and updates a detailed case record, including the business rules in effect when the complaint is filed, copies of all notices provided by the disputes system to the parties, and copies of all communications to and from the parties. At the conclusion of the case, the disputes system automatically prepares an anonymized case summary, and adds the anonymized case summary to a database of anonymized case summaries.

Figure 1:
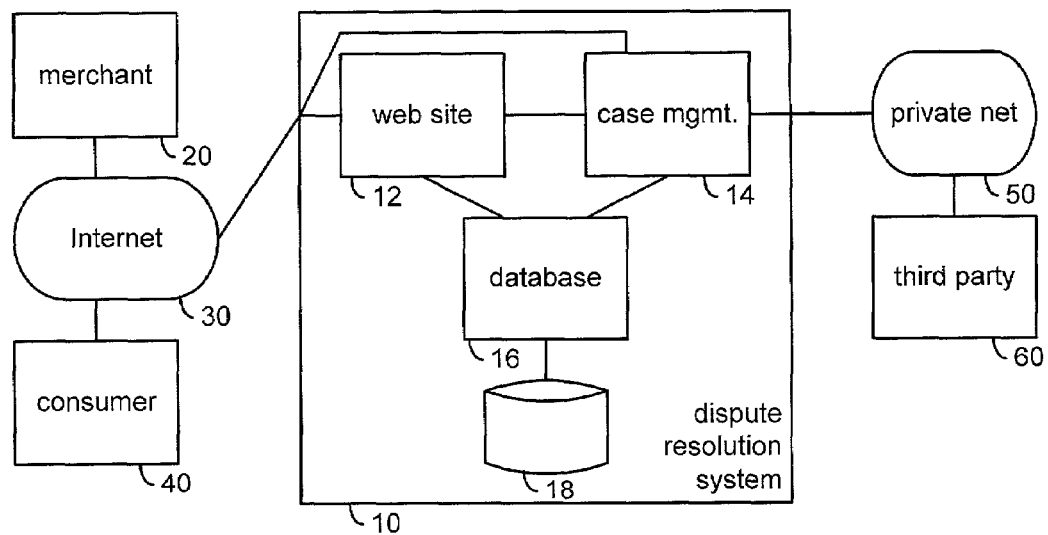
FIG. 1 is a block diagram of the environment in which the present invention is used.

Referring now to the drawings, and in particular to FIG. 1, there is illustrated the environment in which the disputes system is used.

FIG. 1 shows disputes system 10 having web site 12, case management system 14, database system 16 and database 18. Each of web site 12, case management system 14 and database system 16 is adapted to communicate with the other two parts of disputes system 10 to provide the functionality described in FIGS. 2-10. Web site 12 is adapted to receive and transmit information using Internet 30 according to hypertext transfer protocol. Case management system 14 is adapted to receive and transmit electronic mail (e-mail) using Internet 30. Database system 16 is adapted to maintain database 18, including receiving merchant and consumer registration information, and providing access to anonymized case summaries of processed cases and merchant public records.

Disputes system 10 is coupled to Internet 30, or similar public communication network, and to private network 50. Merchant 20 and consumer 40 are coupled to Internet 40 via a conventional access method such as respective personal computers executing browser software coupled to respective Internet service providers. Third party 60 is shown as being coupled to private network 50. In some embodiments, third party 60 is coupled to Internet 30 in similar manner as merchant 20 and consumer 40. It will be understood that there are many merchants and consumers coupled to disputes system 10 although only one instance of merchant 20 and one instance of consumer 40 are shown in FIG. 1.

Although there is only one instance of third party 60 shown in FIG. 1, it will be understood that many third parties may be coupled to disputes system 10.

Generally, during a setup phase, consumers and merchants register with dispute system 10. During an operation phase, a consumer fills out a complaint with assistance from disputes system 10. If the complaint can be resolved based on the target merchant's dispute handling rules, then system 10 automatically resolves the complaint. Otherwise, disputes system 10 automatically mediates resolution of the complaint between the consumer and the merchant. While mediation involves interacting with the consumer and the merchant, disputes system 10 performs the interaction in a fully automated manner, that is, no human mediator is involved. If an agreement is reached, disputes system 10 monitors compliance with the agreement. After compliance monitoring, or if no agreement was reached, the complaint is considered closed and disputes system 10 automatically prepares an anonymized case summary. Throughout the operation phase, disputes system 10 automatically updates the merchant's public record to reflect the current status of the case.

The anonymized case summaries and the merchant public records are available to any visitors to web site 12, irrespective of whether the visitors are registered members of system 10, to enable visitors to check on the dispute handling performance of merchants, and to obtain information about the disputes market.

Setup

Figures 2, 3A, 4A:
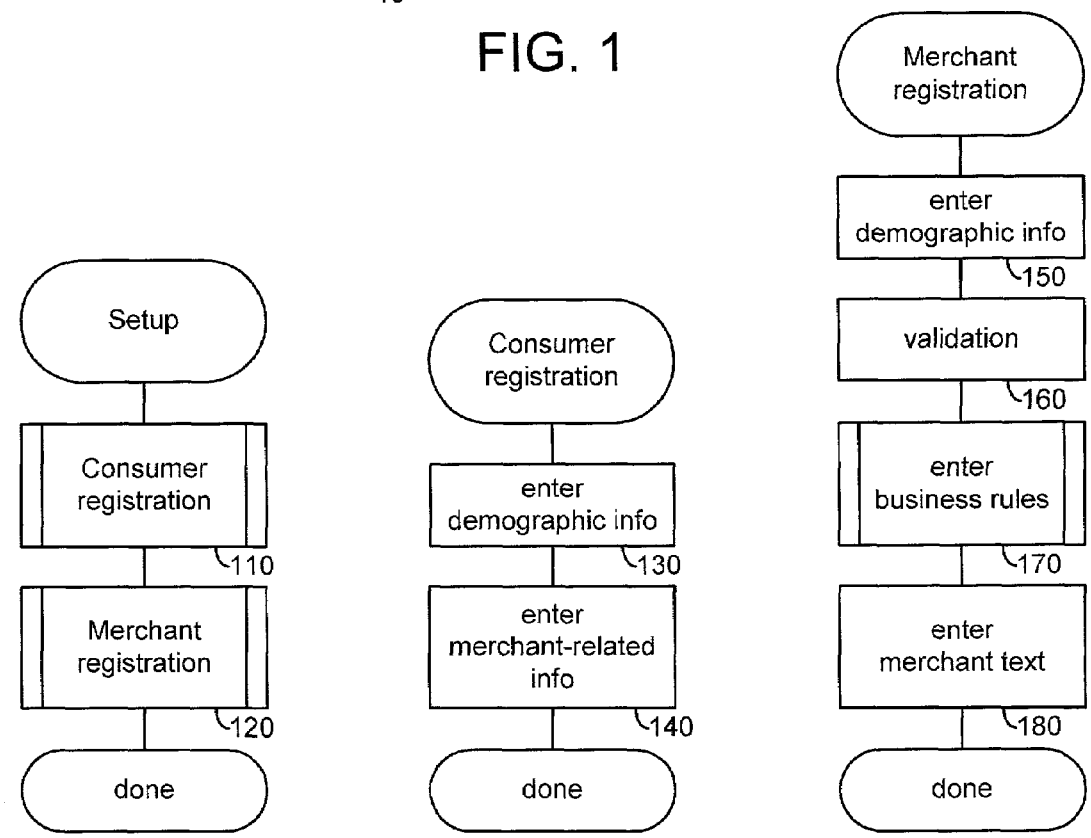
FIG. 2 is a flowchart depicting part of setup for system 10.
FIG. 3A is a flowchart depicting the consumer registration portion of the setup process of FIG. 2.
FIG. 4A is a flowchart depicting the merchant registration portion of the setup process of FIG. 2.

FIG. 2 is a flowchart depicting part of setup for system 10. Throughout the flowcharts, a box with double sidelines indicates a procedure call, that is, another flowchart. At step 110, consumer registration processing occurs. At step 120, merchant registration processing occurs.

FIG. 3A is a flowchart depicting the consumer registration portion of the setup process of FIG. 2. At step 130, disputes system 10 obtains demographic information from consumer 40. At step 140, consumer 40 provides its merchant-related information to disputes system 10, such as the handle used by consumer 40 at merchant 20's web site (not shown).

FIG. 3B is a chart illustrating consumer registration record 210. Consumer registration record 210 is seen to include a consumer registration i.d. such as a unique alphanumeric designation generated by disputes system 10, consumer demographic information discussed further below, consumer system information such as an access password, pointers to pending cases in case management system 14 such as unique case identifiers, a list of processed cases for this consumer such as unique case identifiers or pointers, and information for a consumer's private record including statistics about usage of disputes system 10 automatically updated by disputes system 10. It will be appreciated that consumer registration record 210 may be implemented as one physical record or as a series of logically coupled records or as fields in various records identifiable as relating to consumer 40 or in other manners apparent to those of ordinary skill in the art.

FIG. 4A is a flowchart depicting the merchant registration portion of the setup process of FIG. 2. At step 150, disputes system 10 obtains demographic information from merchant 20. At step 160, disputes system 10 validates merchant 20, that is, ensures that the party providing information is actually authorized to represent merchant 20. Validation can occur in various ways, including (i) a person places a telephone call to merchant 20 and confirms authority, (ii) a third party validation service provides authorization, or (iii) an organization that merchant 20 is affiliated with provides validating information, such as an access code known only to merchant 20.

At step 170, merchant 20 provides its business rules for dispute handling to system 10. Business rules are provided through one or more types of interfaces. Screen-based interfaces include: (i) providing all possible choices with checkoff buttons to indicate which are desired, (ii) a dynamic dialog that requests information from a merchant and builds a rule as the information is provided, and (iii) a set of static pages that form a guidance system for preparing a rule. Information is collected via text entry, radio buttons, pull down menus and the like. The rule is displayed in one or more of (a) internal system form, and (b) a more human-friendly form, in which phrases are substituted for variable names and data relationships are explicitly stated in words rather than by positioning or parentheses. Non-screen based interfaces include speech synthesis and voice response driven systems.

At step 180, merchant 20 optionally provides text paragraphs to system 10 for provision to consumers at various designated points in the dispute handling process, as shown in Table 1.

TABLE 1

| identifier | time provided |
| --- | --- |
| Merchant-Text-1 | when system 10 detects that consumer is trying to file a complaint against this merchant |
| Merchant-Text-2 | when the consumer has filed a complaint |
| Merchant-Text-3 | when an agreement has been automatically reached based on the merchant's business rules |
| Merchant-Text-4 | when the system has prepared the merchant's Answer for automated mediation based on the merchant's business rules |
| Merchant-Text-5 | when an agreement could not be reached in automated mediation |
| Merchant-Text-6 | when an agreement has been reached in automated mediation |
| Merchant-Text-7 | when both consumer and merchant have complied with the terms of an agreement |

FIG. 4B is a chart illustrating merchant registration record 220. Merchant registration record 220 is seen to include a merchant registration i.d. such as a unique alphanumeric designation generated by disputes system 10, merchant demographic information discussed further below, merchant system information such as an access password, the merchant's business rules for dispute handling, and the merchant's text for provision during dispute handling, pointers to pending cases in case management system 14 such as unique case identifiers, a list of processed cases for this merchant such as unique case identifiers or pointers, and a pointer to merchant public record 230 shown in FIG. 4C. It will be appreciated that merchant registration record 220 may be implemented as one physical record or as a series of logically coupled records or as fields in various records identifiable as relating to merchant 20 or in other manners apparent to those of ordinary skill in the art.

FIG. 4C is a chart illustrating merchant public record 230. Merchant public record 230 is seen to include a merchant registration i.d. such as a unique alphanumeric designation generated by disputes system 10 and merchant identification information recognizable to consumers such as "doing business as" names, web site identifiers and so on. Merchant public record 230 also includes summary information such as number of pending cases, number of processed cases, percent of cases in which an agreement was reached, and percent of cases in which compliance occurred given that an agreement was reached. Disputes system 10 automatically updates the summary information in merchant public record 230. Merchant public record 230 also includes, for each pending case, its current status, and for each processed case, its status at the conclusion of processing by disputes system 10. Since merchant public record 230 is strictly formatted and is updated only by disputes system 10 in a predetermined manner, it is straightforward to compare the dispute handling performance of different merchants. In contrast, so called "feedback records" wherein people enter comments about merchants are difficult to aggregate as people use words differently, characterize the same behavior differently and so on.

FIG. 4D is a chart illustrating a business rule template. For a problem selected from a set of problem types, a merchant can specify at least one acceptable solution selected from a set of solution types. Each of the problem types and solution types can be modified with problem parameters and solution parameters, respectively. The problem parameters and solution parameters can be used in Boolean expressions; if the problem or solution parameters are of numeric type, then they can be used in computations, e.g., "if (today_date—purchase_date)<30) then . . . " The problem parameters can relate to the item that is the subject of the complaint, such as "item order no.", or to characteristics of the consumer, such as "member of merchant's preferred buyer club", and so on The merchant must specify a precedence ordering for solutions. Accordingly, when a consumer happens to indicate that multiple solutions are acceptable to resolve his or her complaint, disputes system 10 selects the "best" solution based on the merchant's predefined precedence ordering.

Figure 4E:
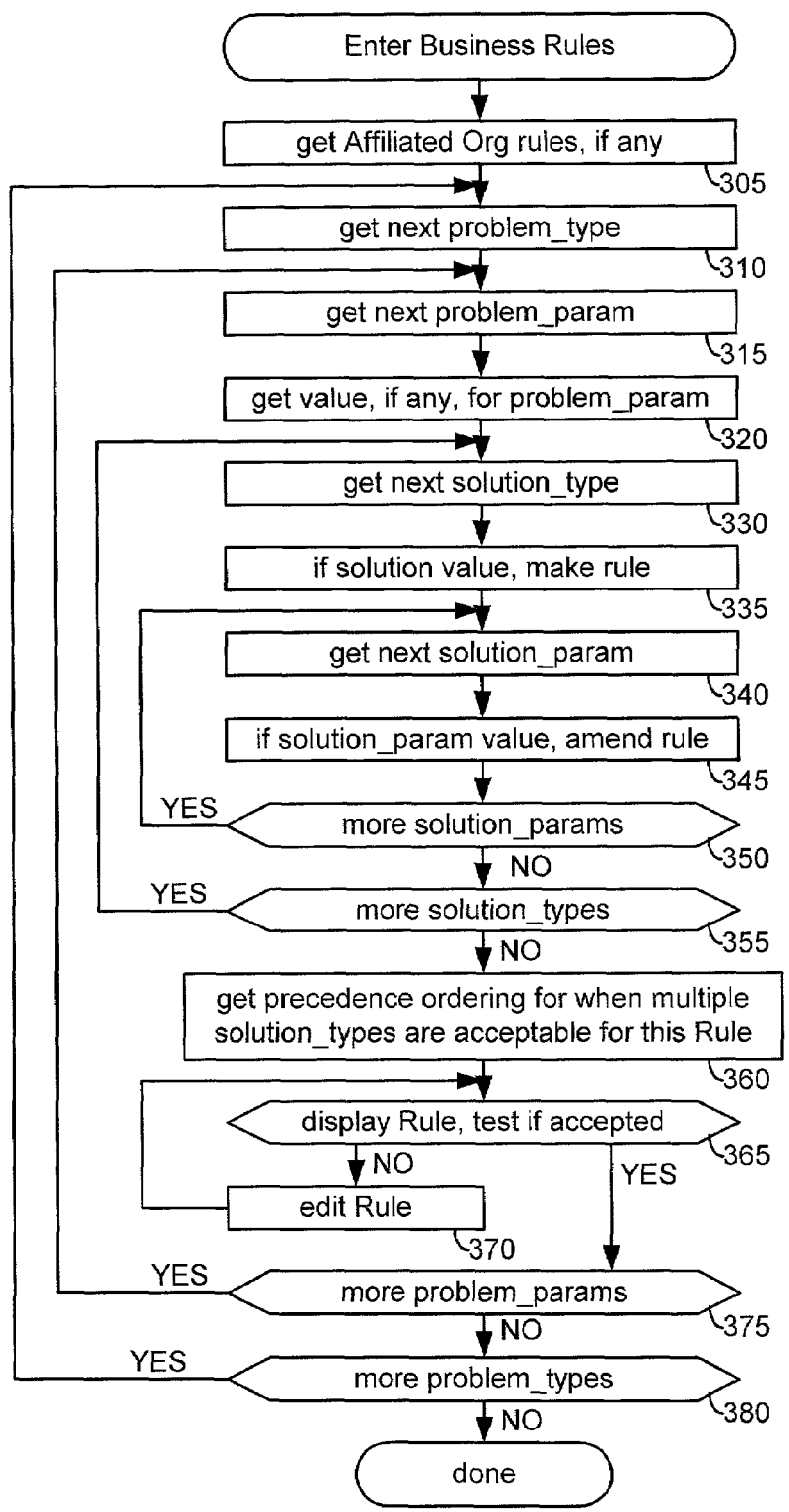
FIG. 4E is a flowchart depicting entering business rules for a merchant.

FIG. 4E is a flowchart depicting entering business rules for a merchant, more specifically, the interaction between merchant 20 and system 10 when merchant 20 provides its dispute handling rules to system 10.

At step 305, disputes system 10 obtains the rules for any organization that the merchant is affiliated with, and displays these rules to the merchant. In one embodiment, the affiliated organization rules are referenced by linking, so that the affiliated organization rules may be updated from time to time in a manner transparent to all the merchants affiliated with the organization. In another embodiment, the affiliated organization rules are copied into the merchant's rules when the merchant's rules are entered.

At step 310, system 10 obtains the next problem type from the set of problem types, in this iteration, the first problem type. At step 315, system 10 obtains the next problem parameter from the set of problem parameters, in this iteration, the first problem parameter. At step 320, system 10 obtains a value, if any, for the problem type's problem parameter from merchant 20.

At step 330, system 10 obtains the next solution type from the set of solution types, in this iteration, the first solution type. At step 335, if the solution type is indicated by the merchant as being acceptable, system 10 makes a rule or updates an existing rule. At step 340, system 10 obtains the next solution parameter from the set of solution parameters, in this iteration, the first solution parameter. At step 345, if a value for the solution parameter is specified, system 10 updates the rule accordingly.

At step 350, disputes system 10 checks if there are more solution parameters, and if so, returns to step 340. At step 355, disputes system 10 checks if there are more solution types, and if so, returns to step 330.

At step 360, if more than one solution has been specified as being acceptable for this type of problem, with parameter values, if any, then system 10 obtains a precedence ordering for the acceptable solutions from merchant 20.

At step 365, disputes system 10 shows the merchant the rule just built. If the rule is not as the merchant wished, then at step 370, the merchant edits the rule. When the rule is acceptable to the merchant, disputes system 10 proceeds to step 375.

At step 375, disputes system 10 checks if there are more problem parameters, and if so, returns to step 315. New rules will be built, if solutions are specified, and accepted as described above.

At step 380, disputes system 10 checks if there are more problem types, and if so, returns to step 310. When all problem types have been checked, processing is complete.

Operation

Figure 5:
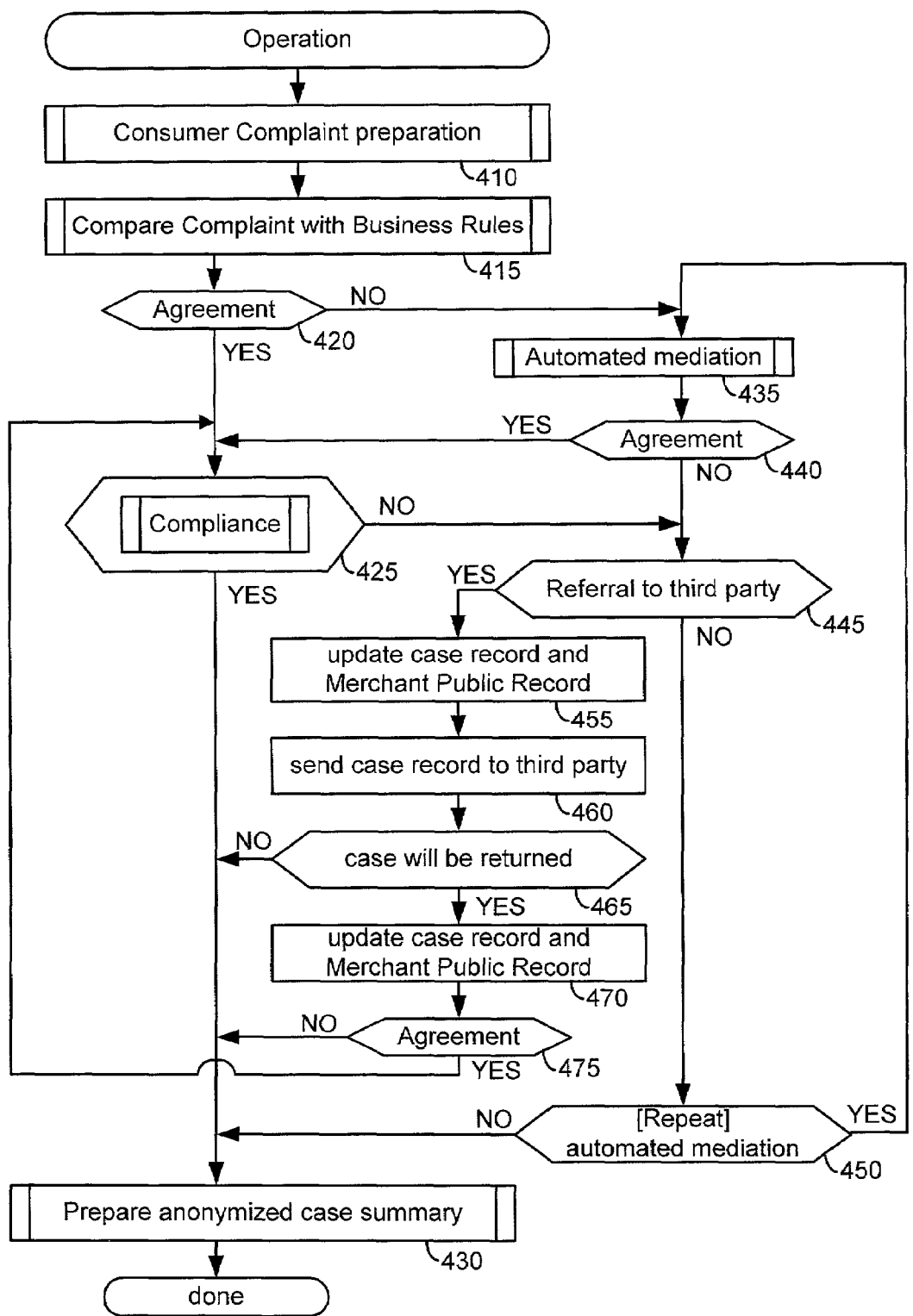
FIG. 5 is a flowchart depicting operation of system 10.

FIG. 5 is a flowchart depicting operation of system 10.

Figure 6:
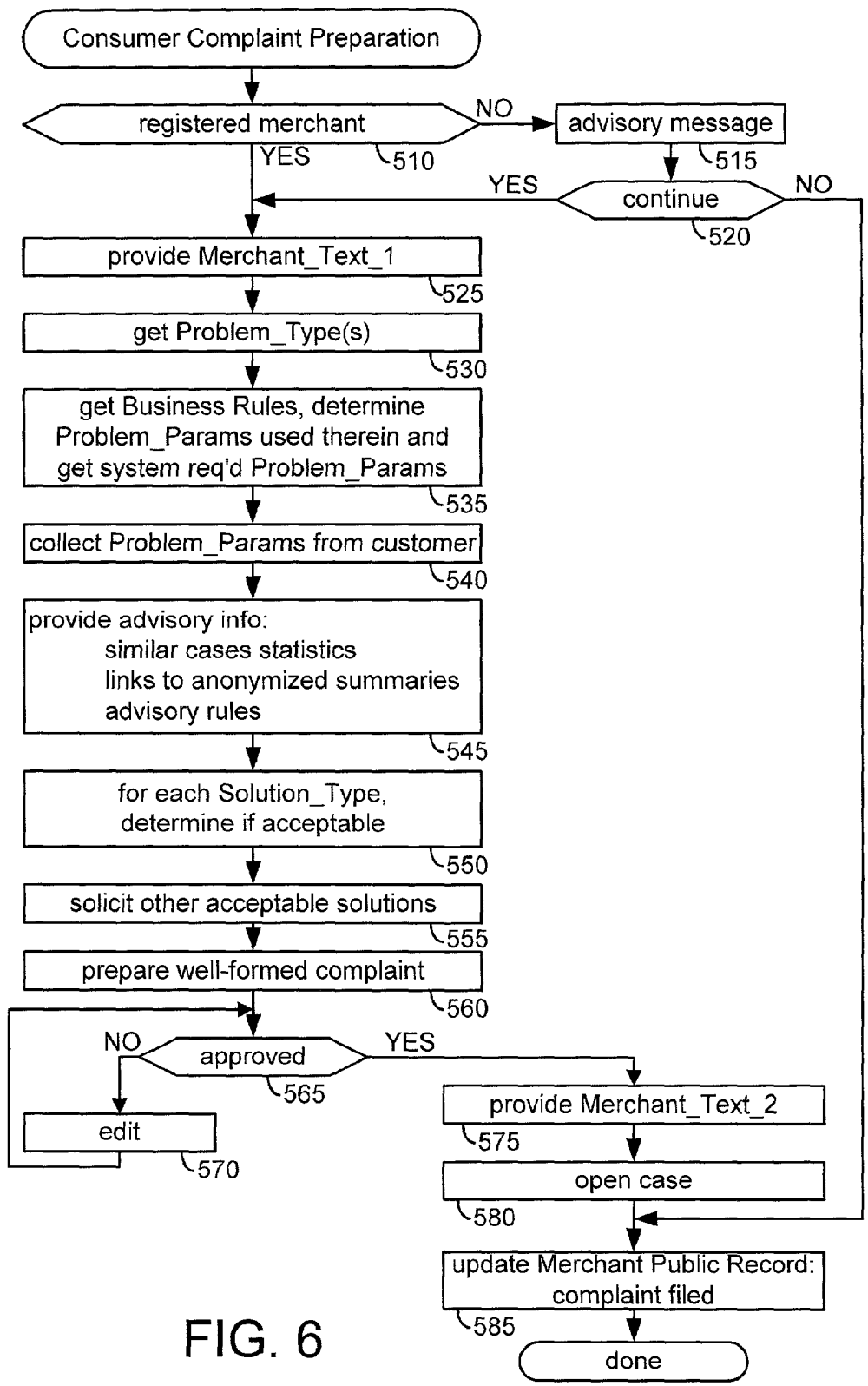
FIG. 6 is a flowchart depicting the consumer complaint preparation portion of the operation process of FIG. 5.

At step 410, consumer 40 prepares a complaint using disputes system 10, as shown in FIG. 6.

Figure 9:
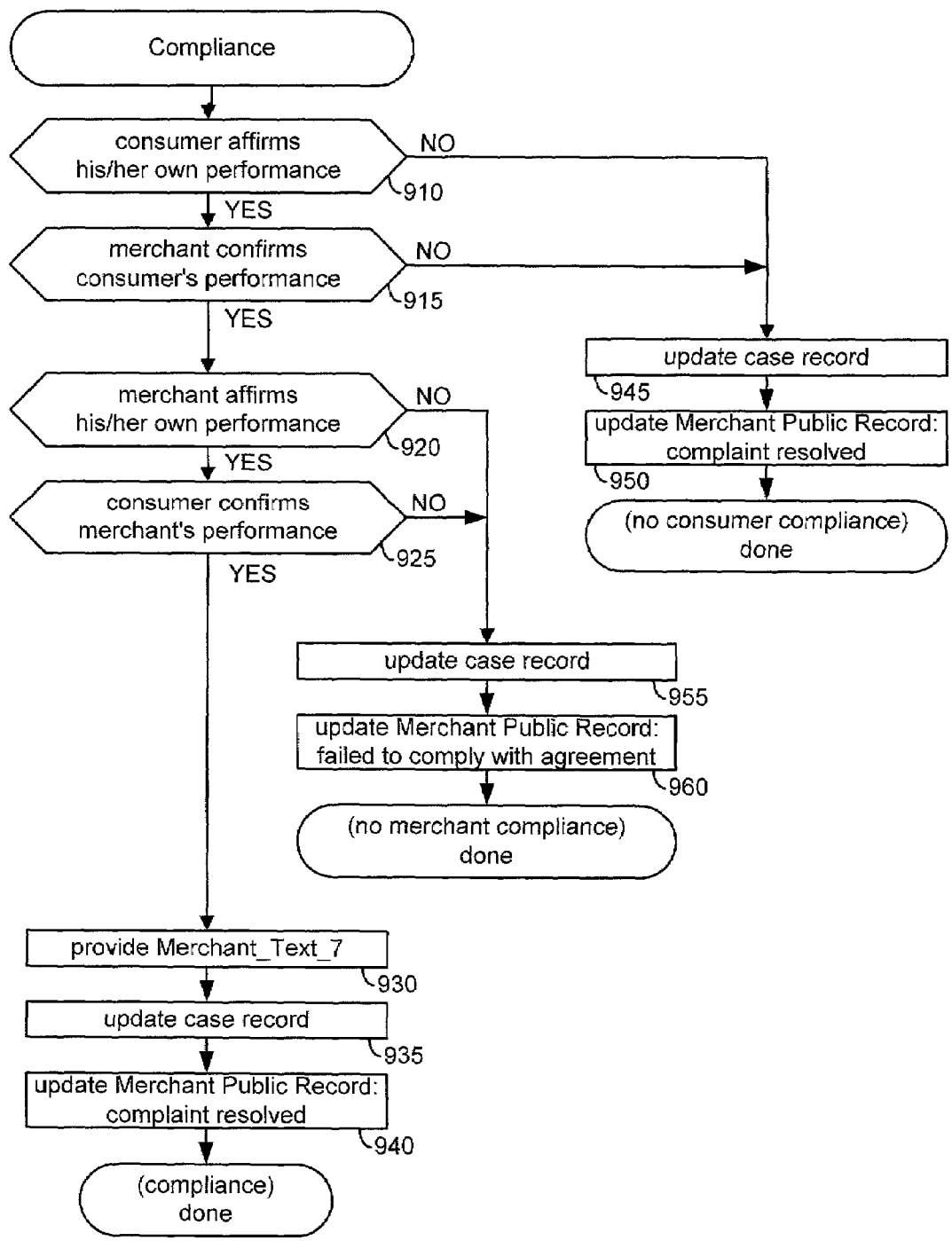
FIG. 9 is a flowchart depicting the compliance portion of the operation process of FIG. 5.

At step 415, disputes system 10 compares the complaint from consumer 40 with the business rules for the merchant named in the complaint, herein assumed to be merchant 20 to detect whether merchant 20 will agree to the solutions desired by consumer 40. At step 420, disputes system 10 determines whether there is an agreement. If so, then at step 425, disputes system 10 monitors compliance with the agreement, as shown in FIG. 9.

If merchant 20 and consumer 40 have performed according to their agreement, then at step 430, disputes system 10 automatically prepares an anonymized case summary, as shown in FIG. 10A, and processing of the complaint is complete.

Figure 8A:
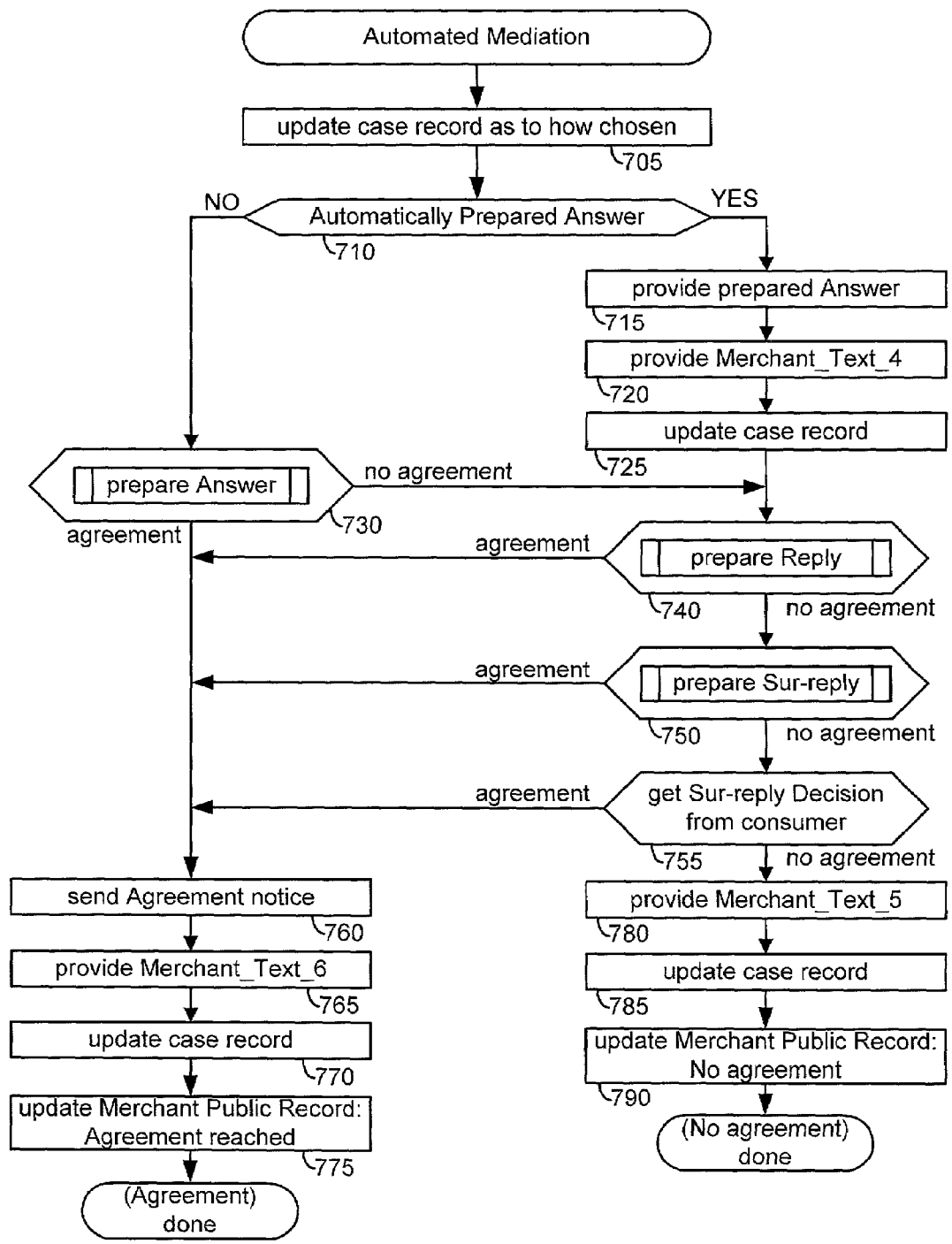
FIG. 8A is a flowchart depicting the automated mediation portion of the operation process of FIG. 5.

If an agreement was not detected by disputes system 10 at step 420, then at step 435, disputes system 10 performs automated mediation between merchant 20 and consumer 40, as shown in FIG. 8A. Consent to one round of automated mediation, as shown in FIG. 8A, is assumed due to registration of merchant 20 and consumer 40 with system 10. It will be appreciated that, if an agreement is not automatically reached based on the business rules, a complaint always is sent to automated mediation. At step 440, disputes system 10 determines whether there is an agreement. If so, then processing proceeds to step 425 for compliance monitoring.

If an agreement has not been reached through automated mediation, then at step 445, disputes system 10 determines whether the complaint should be referred to a third party.

One example of a third party is a human-directed dispute resolution service (system 10 is a computer-directed dispute resolution service) for mediation or arbitration; the complaint is referred to a human-directed dispute resolution service when both merchant 20 and consumer 40 consent to such referral and agree on how to pay the human-directed dispute resolution service. Typically, the human-directed dispute resolution service returns the complaint to disputes system 10 after performing human-directed dispute resolution, which may or may not result in an agreement.

Another example of a third party is a computer-directed arbitration service (system 10 is a computer-directed mediation service). In particular, if consumer 40 used a credit card or debit card as his or her payment method, then merchant 20 typically must comply with automated dispute resolution procedures promulgated by the card provider. The complaint can be referred from disputes system 10 to the payment arbitration service on the decision of consumer 40 alone, that is, consent by merchant 20 to the payment service's dispute resolution procedures is implied by acceptance of the payment card. The card provider usually is subject to an automated rules based arbitration system, with a procedure for appealing to a human arbitrator. The payment arbitration services typically do not return the complaint to disputes system 10; other computer-directed arbitration services may return the complaint to disputes system 10 after their processing thereof.

A further example of a third party is a government regulator, such as the Federal Trade Commission (FTC), which has responsibility for policing consumer fraud. The complaint can be referred from disputes system 10 to the government regulator on the decision of either merchant 20 or consumer 40 alone. The government regulator typically does not return the complaint to disputes system 10 after its processing thereof.

Another example of a third party is a compensation fund that makes awards to consumers that are not properly cared for by merchants.

If the complaint is not to be referred to a third party, then at step 450, disputes system 10 checks whether merchant 20 and consumer 40 wish to go through another round of automated mediation. If both merchant 20 and consumer 40 agree, then processing proceeds to step 435. If at least one of merchant 20 and consumer 40 does not wish to continue automated mediation, then processing proceeds to step 430 to prepare an anonymized case summary. Disputes system 10 keeps track of how many rounds of automated mediation a complaint has experienced, and when the number of rounds reaches a predetermined threshold, disputes system 10 generates an exception report for delivery to the administrator of disputes system 10. The administrator may elect to intervene, such as by offering free human directed mediation to the parties. Alternatively, these multi-round cases may simply be flagged for subsequent study to better understand the dynamics of dispute resolution.

If the complaint is to be referred to a third party, then at step 455, disputes system 10 updates the case record and the merchant public record as appropriate, and at step 460, sends the case record to the third party. At step 465, disputes system 10 checks whether the case will be returned. If the case will not be returned, then processing proceeds to step 430 to prepare an anonymized case summary. If the case will be returned from the third party to disputes system 10, then at step 470, disputes system 10 waits for the return of the case and when the complaint is returned, updates the case record and the merchant public record, as appropriate, to reflect what occurred at the third party. At step 475, disputes system 10 determines whether there is an agreement. If so, then processing proceeds to step 425 for compliance monitoring. If an agreement has not been reached, then processing proceeds to step 430 to prepare an anonymized case summary.

Disputes system 10 typically communicates with merchant 20 and consumer 40 using a web site based interface, but also using e-mail. In some embodiments, web pages are dynamically created for presentation based on the status and details of the case. In some embodiments, disputes system 10 leaves voice mail messages, send faxes or otherwise utilizes communication channels to transfer information between merchant 20 and consumer 40.

Complaint Preparation

FIG. 6 is a flowchart depicting the consumer complaint preparation portion of the operation process of FIG. 5.

At step 510, disputes system 10 checks whether the merchant that consumer 40 is trying to prepare a complaint against is a merchant registered with disputes system 10. If the merchant is not registered with disputes system 10, then at step 515, disputes system 10 advises consumer 40 that the merchant is not registered, and so may not respond to the complaint. At step 520, disputes system 10 checks whether the consumer wishes to continue. If consumer 40 elects to proceed with complaint preparation, processing proceeds to step 525 to continue with complaint preparation. Disputes system 10 uses the prepared complaint as an incentive to encourage the merchant to register. Sales staff may also contact the merchant and try to get the merchant to register. If consumer 40 does not wish to continue with complaint preparation, then processing proceeds to step 585, and disputes system 10 uses the complaint to prepare a public record for an unregistered merchant, so that web site visitors can evaluate unregistered merchants based on the prepared complaints.

At step 525, disputes system 10 provides Merchant-Text-1 to consumer 40, such as, "XYZ Company apologizes for any problem you are having with your purchase. While you are welcome to use this system to file a complaint, we request that you go to our web site and click on the tab labeled Customer Service before filing a complaint with this system." Another example of Merchant-Text-1 is, "WXY Company wants you to be happy with your purchase. We appreciate that you are taking the time to let us know how we can correct any problem you are having with a purchase from us. To thank you, we are giving you a coupon for 20% off your next purchase from us. Please enter coupon code DISPUTES123 when next ordering from us. We look forward to correcting the problem you are experiencing."

At step 530, disputes system 10 gets the problem type(s) from consumer 40. At step 535, disputes system 10 obtains the set of rules in effect for merchant 20, including the business rules provided by merchant 20 and the rules of any organization that merchant 20 is affiliated with. In a modification, if the affiliated organization rules are already reflected in merchant 20's rules, then the affiliated organization rules are not obtained at step 535. Disputes system 10 also obtains the system required problem parameters, that is, the minimal set of problem parameters that must be specified for each problem type. System 10 prepares anonymized case summaries, and may require certain information so that the anonymized case summaries are more meaningful for aggregate disputes market analyses. Based on the required problem parameters and the problem parameters relevant for merchant 20, disputes system 10 identifies the set of information to collect from consumer 40. It will be seen that disputes system 10 adapts its data collection based on the problem presented by consumer 40 and the disputes policy of merchant 20, thereby protecting consumer 40 against unnecessary data collection. At step 540, disputes system 10 collects values for the identified problem parameters from consumer 40.

One of the system required parameters may be how the consumer feels about the problem. Collecting this information enables the consumer to vent their negative feelings, which is an important aspect of conflict resolution. Since disputes system 10 is a computer, that is, not human, consumers are encouraged to "let it all out" without fear of hurting someone's feelings. In one embodiment, disputes system 10 reflects back the consumer's emotional situation, such as by selecting, based on lexical and syntactical analysis, one or more of a set of predefined emotional states and asking the consumer to confirm that its selection is correct. Certain problem types may be associated with default emotional states, e.g., "disappointed, annoyed and frustrated." This emotional reflection comprises anonymizing the emotional response of the consumer (anonymizing is discussed below), with Level I being selecting predetermined emotional states, and Level II being adding the specific words used by consumer 40.

The feeling related information collected from consumer 40 is referred to as emotional detail information. The reflection of the consumer's feelings generated by disputes system 10 is referred to as emotional state information. An example of emotional detail information and corresponding emotional state information is provided in the use cases, below.

Some parameters may enable consumer 40 to upload a file from their personal computer. For example, consumer 40 may wish to provide a copy of their e-mail receipt as an attachment to their complaint, or another computer file, such as an explanatory letter, or a scanned image file. In one embodiment, disputes system 10 automatically creates descriptive information for the attached file, such as, "image of item as received from shipper"; in another embodiment, consumer 40 provides a short textual description of what is in the attached file.

At step 545, disputes system 10 provides advisory information to consumer 40. In one embodiment, disputes system 10 uses the complaint characteristics to search for anonymized case summaries having similar characteristics, and then creates a custom summary of the case resolutions in the similar cases, for example, a pie chart showing the top five resolution types and their percentage, and presents this information to consumer 40. In a modification, disputes system 10 provides access to the five most recent anonymized case summaries having similar characteristics, in addition to or instead of the custom summary. In another embodiment, disputes system 10 has a set of advisory rules, and based on the characteristics of the complaint, determines how the complaint would be resolved under the advisory rules. For example, the credit card association chargeback rules could be the set of advisory rules, and be consulted independent of the payment form used in the problem. In another embodiment, system 10 simply encourages consumer 40 to browse the anonymized case summaries. In some cases, system 10 may provide general information such as, "complaints identifying at least two acceptable solutions are 73% more likely to be immediately resolved than complaints identifying only one acceptable solution," or whatever the actual statistic is.

Providing advisory information, also referred to as relevant contextual information, helps set expectations for consumer 40. Specifically, when the advisory information is relevant to consumer 40's specific problem, consumer 40 is more likely to consider such information. The process of providing advisory information frames the issue to consumer 40 as participating in an infrastructure for problem solving, rather than having an isolated problem.

At step 550, disputes system 10 obtains desired types of solutions from consumer 40. At step 555, system 10 may ask consumer 40 to approve other solutions, such as the most popular solution for the consumer's type of problem, merchant 20's preferred solution for this type of problem, and so on.

At step 560, disputes system 10 uses the information provided by consumer 40 to prepare a well-formed complaint, that is, a complaint having information pertinent to the problem that the consumer can provide and which is needed for problem resolution, the information being organized and presented so it is readily understood by a human. If emotional information was provided, system 10 provides its reflection of the emotional information, so that the well-formed complaint is more polite and professional.

As used herein and in the claims, a well-formed message includes identification of the case, date of the message, type of the message—e.g., Complaint, Answer, Reply or Sur-reply—and substantive information for the message. When the message is a response to another message, i.e., not a complaint, the message also includes the next action and a date by which the next action must be taken.

At step 565, disputes system 10 asks consumer 40 to approve filing of the well-formed complaint. If consumer 40 wishes to modify the complaint, at step 570, disputes system 10 enables consumer 40 to edit the complaint. When the consumer is satisfied with the well-formed complaint and approves its filing, processing proceeds to step 575.

At step 575, disputes system 10 provides Merchant-Text-2, if any, to consumer 40. At step 580, disputes system 10 opens a case for this complaint. Disputes system 10 creates a case record comprising the registration identifiers for consumer 40 and merchant 20, the rules in effect at the start of the case, the information provided by consumer 40, and the well-formed complaint approved by consumer 40. Associating the rules in effect at the start of the case with the case record facilitates subsequent analysis of the dynamics of dispute resolution; specifically, "what if" scenarios are easier to analyze because the entire rule set is available.

At step 585, disputes system 10 updates public record 230 for merchant 20 to indicate that a new complaint has been filed, and complaint preparation processing is complete.

Automated Agreement

Figure 7:
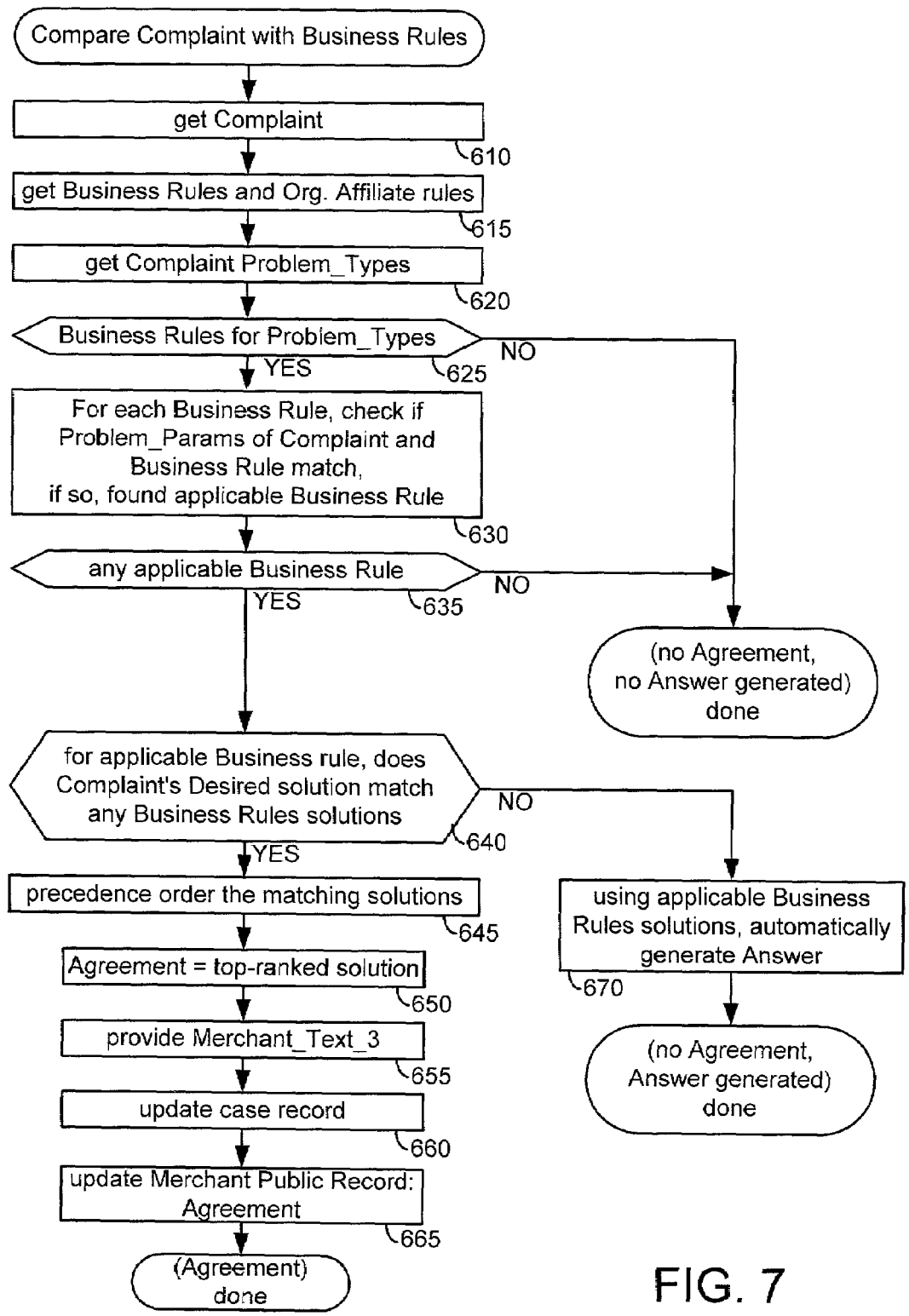
FIG. 7 is a flowchart depicting the comparing of a complaint with a merchant's business rules portion of the operation process of FIG. 5.

FIG. 7 is a flowchart depicting the comparing of a complaint with a merchant's business rules portion of the operation process of FIG. 5.

At step 610, disputes system 10 gets the case record and obtains the complaint information. At step 615, disputes system 10 gets the business and organizational rules from the case record, hereafter referred to as "business rules" for brevity. At step 620, disputes system 10 obtains the complaint problem type(s). At step 625, disputes system 10 checks whether there are business rules applicable to the problem type(s) in the complaint. If there are no applicable business rules, then automated agreement processing terminates, and the case proceeds to automated mediation.

If there are business rules applicable to the complaint's problem type(s), then at step 630, disputes system 10 determines whether the values provided by consumer 40 for the problem parameters, at step 540 of FIG. 6, are consistent with the business rule being applicable to the consumer's problem. At step 635, checks whether there are any business rules that apply to this complaint. If there are no applicable business rules, then automated agreement processing terminates, and the case proceeds to automated mediation.

If there are applicable business rules, then at step 640, disputes system 10 checks whether any of the desired solutions in the complaint match the solutions specified in the business rules. If none of the desired solutions in the complaint match the solutions specified in the business rules, then at step 670, disputes system 10 identifies the solutions in the applicable business rules as merchant 20's counter-offer to consumer 40's desired solutions. Disputes system 10 automatically prepares an Answer to the complaint incorporating the identified solutions, and the case proceeds to automated mediation with the merchant's Answer automatically generated by disputes system 10. Automatically preparing an Answer is also referred to as generating a complaint resolution offer on behalf of the party based on the acceptable solutions specified in the rules of the party.

If any of the desired solutions in the complaint match the solutions specified in the business rules, then at step 645, system 10 precedence orders the matching solutions, and at step 650, defines the top-ranked solution as being an agreement between merchant 20 and consumer 40 and notifies consumer 40 of an agreement. It will be appreciated that the agreement has been immediately determined in response to the complaint.

At step 655, disputes system 10 provides Merchant-Text-3, if any, to consumer 40. For example, Merchant-Text-3 may be product return instructions for consumer 40, including an estimate of when the consumer will receive a refund. In one embodiment, Merchant-Text-3 has different versions depending on the type of solution in the agreement. At step 660, disputes system 10 updates the case record to reflect that an agreement was automatically determined, and appends the notices provided to consumer 40. At step 665, disputes system 10 updates merchant public record 230 to reflect that an agreement was reached in this case, and automated agreement processing is complete.

Automated Mediation

FIG. 8A is a flowchart depicting the automated mediation portion of the operation process of FIG. 5.

Figure 8B:
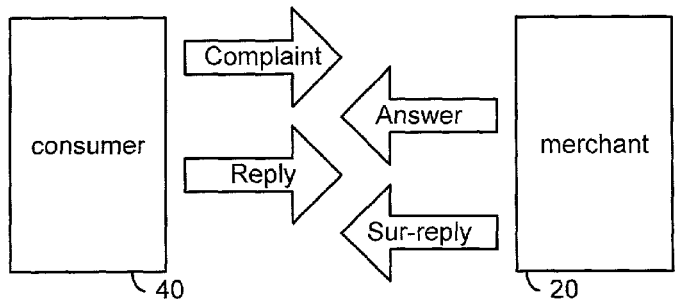
FIG. 8B is a chart illustrating the automated mediation procedure used in system 10.

FIG. 8B shows a round of automated mediation as comprising the Complaint from consumer 40 against merchant 20, followed by an Answer from merchant 20 to consumer 40, followed by a Reply from consumer 40 to merchant 20, and concluding with a Sur-reply from merchant 20 to consumer 40. An agreement can occur upon receiving the Complaint, Answer, Reply or Sur-reply. An agreement requires the consent of both merchant 20 and consumer 40. In some disputes, an agreement does not occur.

At step 705 of FIG. 8A, disputes system 10 updates the case record to indicate why automated mediation is occurring, generally, because a complaint could not be initially resolved based on automated rules, or because the parties have agreed to another round of automated mediation. If necessary, disputes system 10 updates merchant public record 230 to indicate that the case is pending.

At step 710, disputes system 10 checks if there is an automatically prepared Answer. If there is an automatically prepared Answer, from step 670 of FIG. 7, then at step 715, disputes system 10 provides the Answer to consumer 40. At step 720, disputes system 10 provides Merchant-Text-4, if any, to consumer 40, and at step 725, disputes system 10 updates the case record to reflect provision of the Answer and Merchant-Text-4. The automatically prepared Answer and Merchant-Text-4 are usually presented to consumer 40 while he or she is still at web site 12, after filing the Complaint. In some embodiments, the automatically prepared Answer and Merchant-Text-4 are delivered to consumer 40 via e-mail.

Figure 8C:
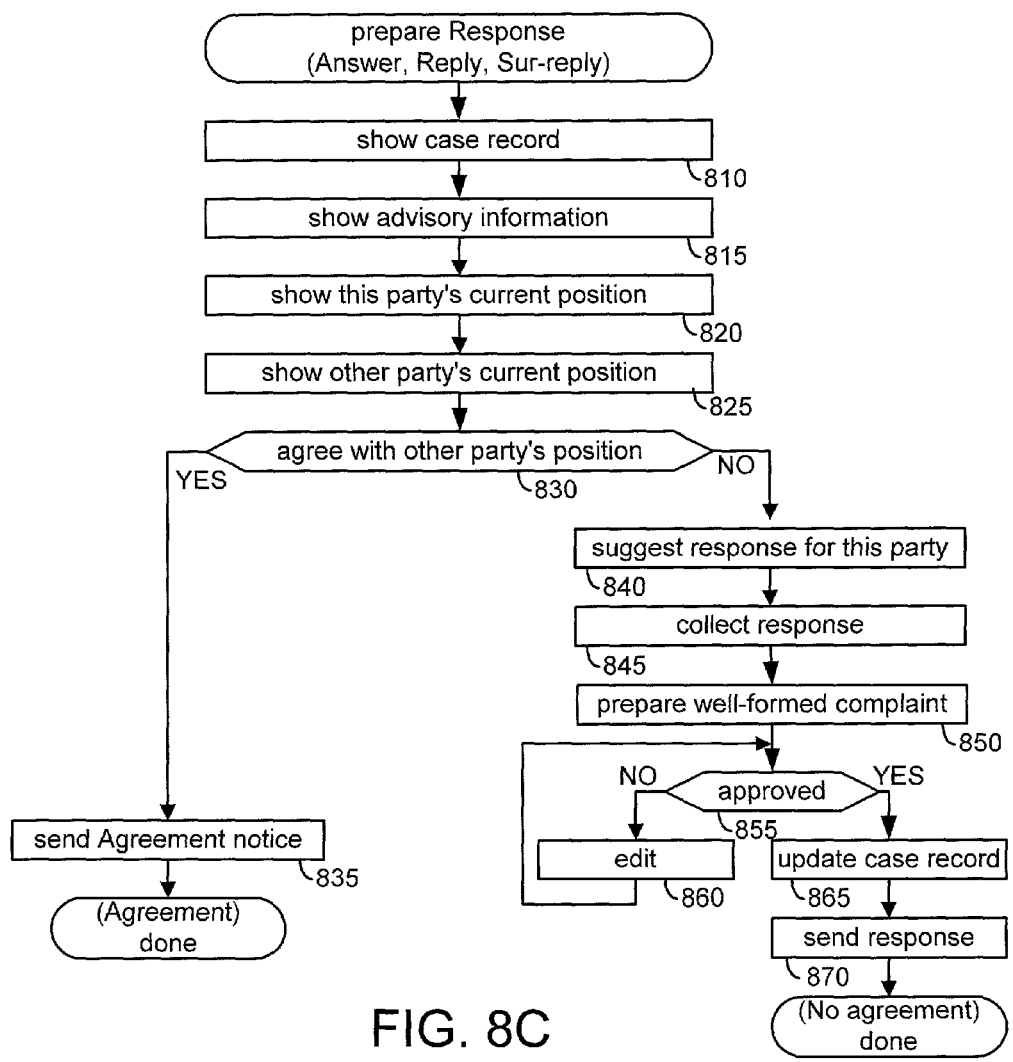
FIG. 8C is a flowchart depicting preparation of a response in automated mediation.

If no automatically prepared Answer exists, then at step 730, disputes system 10 assists merchant 20 in preparing an Answer according to the logic shown in FIG. 8C.

After preparation of an Answer, if an agreement does not exist, then at step 740, disputes system 10 assists consumer 40 in preparing a Reply according to the logic shown in FIG. 8C.

After preparation of a Reply, if an agreement does not exist, then at step 750, disputes system 10 assists merchant 20 in preparing a Sur-reply according to the logic shown in FIG. 8C.

At step 755, disputes system 10 checks whether consumer 40 has accepted one of the solutions proposed in merchant 20's Sur-reply.

If no agreement exists after the Sur-reply, then at step 780, disputes system 10 provides Merchant-Text-5, if any, to consumer 40. At step 785, disputes system 10 updates the case record to reflect lack of an agreement. At step 790, disputes system 10 updates merchant public record 230 to show that no agreement was reached, and automated mediation is complete.

If an agreement was detected at steps 730, 740, 750 or 755, then at step 760, disputes system 10 sends a notice of the agreement to consumer 40 and merchant 20. At step 765, disputes system 10 provides Merchant-Text-6, if any, to consumer 40, and at step 770, disputes system 10 updates the case record to reflect the agreement. At step 775, disputes system 10 updates merchant public record 230 to show that an agreement was reached, and automated mediation processing is complete.

If merchant 20 does not respond within the allotted time for response, then the case is closed and the merchant's public record is updated to show that the merchant was non-responsive to a complaint.

If consumer 40 does not respond within the allotted time for response, then consumer 40 is presumed to have abandoned the case, the case is closed and the merchant's public record is updated to show that the case was successfully resolved.

FIG. 8C is a flowchart depicting preparation of a response in automated mediation. A response is any one of an Answer, a Reply or a Sur-reply. The party preparing the response is merchant 20, in the case of an Answer or Sur-reply, and is consumer 40, in the case of a Reply.

At step 810, disputes system 10 shows the case record to the party preparing the response, such as by appending the case record to an e-mail or providing a hyperlink to a password-protected web page showing the case record. At step 815, disputes system 10 may show advisory information to the party preparing the response, such as a pie chart indicating the most popular resolutions of similar disputes. At step 820, disputes system 10 shows this party's current position, that is, the solutions indicated as acceptable to this party. Where an Answer is being prepared, there may be no solutions indicated as acceptable based on merchant 20's business rules. At step 825, disputes system 10 shows the contra-party's current position, that is, the solutions acceptable to the contra-party.

At step 830, disputes system 10 determines whether the party preparing the response agrees with any of the contra-party's acceptable solutions. If so, then an agreement has been reached and at step 835, disputes system 10 sends an agreement notice to consumer 40 and merchant 20.

If the party preparing the response does not agree to any of the contra-party's acceptable solutions, then at step 840, disputes system 10 may suggest a response for this party. In particular, in some cases, disputes system 10 can determine that the parties are in agreement except for certain factors, and suggests a response focused on the factors blocking agreement.

For example, assume that a Sur-reply is being prepared, and that the complaint indicated a refund was acceptable, an automatically prepared Answer offered a refund subject to a re-stocking fee and with no return shipping, and the Reply indicated that a refund was acceptable with a re-stocking fee as long as return shipping was paid by the merchant. Here, the parties agree about a refund with restocking fee, and disagree only about the return shipping fee. Accordingly, system 10 may suggest a Sur-Reply of refund with restocking fee and a personalized handling of the return shipping cost, meaning that merchant 20 should carefully decide how to handle the return shipping feature.

At step 845, disputes system 10 obtains the response from the party preparing the response. In some cases, the party preparing the response may simply agree to system 10's suggestion, such as by sending an e-mail to disputes system 10 with "yes" in the subject line. In other cases, the party preparing the response may interact with pages supplied by web site 12 to provide the response. In some embodiments, such as when the response is a Reply, response preparation includes asking the preparer how he or she feels about the other party's position and/or their own position, such as why it is fair, collecting the response as emotional detail information, and reflecting back their emotional state as emotional state information. Such interaction provides a feeling of "being heard."

At step 850, disputes system 10 prepares a well-formed response based on the information collected at step 845. A well-formed response is a standalone communication stating what the complaint was, the acceptable solutions from the party sending the response, and the options available to the party receiving the response. Usually the options available to the party receiving the response are either to agree to one of the sender's acceptable solutions or to prepare their own response.

At step 855, disputes system 10 checks whether the party preparing the response has approved filing the well-formed response. If not, then at step 860, the party preparing the response edits the well-formed response, and at step 855, disputes system 10 presents the edited well-formed response for filing approval.

After the party preparing the response approves the well-formed response, at step 865, disputes system 10 updates the case record and at step 870, sends the well-formed response to the contra-party. The response is usually sent via e-mail. In some embodiments, other communications methods are used, such as voice mail. No agreement has been reached.

Compliance Monitoring

FIG. 9 is a flowchart depicting the compliance portion of the operation process of FIG. 5. In the embodiment shown in FIG. 9, each of consumer 40 and merchant 20 affirms their own performance and confirms the contra-party's performance. In other embodiments, the affirmance and/or confirmance are performed automatically using an external source, such as third party shipping services or automatic payment services. When an external source is involved, disputes system 10 receives notice from the external source when an event occurs. In a modification, disputes system 10 queries the external source to determine if the event has occurred, and the external source sends notice in response to the query from disputes system 10.

At step 910, disputes system 10 checks whether consumer 40 affirmed that they performed according to the agreement, for example, that consumer 40 returned defective merchandise by a particular date. Consumer 40 affirms their performance by sending an e-mail to system 10, providing information to a web page at web site 12 or the like. At step 915, disputes system 10 checks whether merchant 20 confirmed that consumer 40 performed his or her portion of the agreement. Merchant 20 provides confirmation using e-mail, a web page or other appropriate mechanism.

If consumer 40 did not affirm their performance, or merchant 20 did not confirm consumer 40's performance, then disputes system 10 gives merchant 20 the benefit of the doubt, and considers the complaint to be resolved. At step 945, disputes system 10 updates the case record to reflect non-performance by the consumer, and at step 950, disputes system 10 updates merchant public record 230 to show that the complaint was resolved. Although not shown in FIG. 9, if merchant 20 affirmatively denies performance that consumer 40 has affirmed, there is a procedure whereby consumer 40 can prove their performance.

At step 920, disputes system 10 checks whether merchant 20 affirmed that they performed according to the agreement, for example, that merchant 20 sent a refund check to consumer 40 by a particular date. Merchant 20 provides affirmation in similar manner as consumer 40, discussed above. At step 925, disputes system 10 checks whether consumer 40 confirmed that merchant 20 performed its portion of the agreement. Consumer 40 provides confirmation in similar manner as merchant 20, discussed above.

If merchant 20 did not affirm their performance, or consumer 40 did not confirm merchant 20's performance, then at step 955, disputes system 10 updates the case record to reflect non-performance by the merchant, and at step 960, disputes system 10 updates merchant public record 230 to show that merchant 20 failed to comply with its agreement. Although not shown in FIG. 9, if consumer 40 affirmatively denies performance that merchant 20 has affirmed, there is a procedure whereby merchant 20 can prove its performance.

When both parties have affirmed their performance and confirmed the contra-party's performance, at step 930, disputes system 10 provides Merchant-Text-7, if any, to consumer 40. At step 935, disputes system 10 updates the case record, including closing the case. At step 940, disputes system 10 updates merchant public record 230 to show that the complaint was successfully resolved, and compliance monitoring processing is complete.

It will be appreciated that confirmation of an action can occur by either providing a positive indication, or by failing to provide a negative indication by a particular date.

Anonymized Case Summary

FIG. 10A is a flowchart depicting the preparing an anonymized case summary portion of the operation process of FIG. 5. An anonymized case summary is prepared when disputes system 10 has finished processing a case, to include the activity that occurred during the case as a contribution to a database of disputes while preserving the privacy of the parties to the dispute. At present, the private (non-judicial) dispute resolution market is ill understood as information relating to privately resolved disputes is usually private.

An anonymized dispute can have multiple levels of information granularity. As an example, two levels are explained herein. Level I shows information about the case but only as ranges. Level II shows more specific detail about the case, but still sufficiently broad to not readily identify a party.

An anonymized case summary is prepared by taking the detailed case record, extracting relevant information and then selecting categories for Level I parameters and values for Level II parameters in accordance with the relevant information. The information is organized into parts; in this example, Part 1 of an anonymized case summary is consumer demographic information, Part 2 is merchant demographic information, Part 3 is the procedural history of the case including the complaint description, and Part 4 is the resolution description. A case identifier enables the anonymized case summary to be associated with the detailed case record, should further analysis be required. The privacy of detailed case records is strictly maintained.

FIG. 10B is a chart depicting detailed case record 1050, and FIG. 10C is a chart depicting anonymized case summary 1075. Case record 1050 is coupled to all documents uploaded from a consumer or a merchant during processing of the case, including text files, image files, and so on. In some embodiments, faxes, if any, are scanned at disputes system 10 to become image files that are attached to case record 1050.

At step 1010 of FIG. 10A, disputes system 10 gets case record 1050 and extracts details for the next part, in this iteration, Part 1. At step 1015, disputes system 10 prepares Level I information for anonymized case summary 1075. At step 1020, disputes system 10 prepares Level II information for anonymized case summary 1075. At step 1025, disputes system 10 checks whether there are more parts of anonymized case summary 1075 to prepare. If so, processing returns to step 1010.

When all parts of anonymized case summary 1075 have been prepared, at step 1030, disputes system 10 stores anonymized case summary 1075 in database 18. At step 1035, disputes system 10 archives case record 1050, and anonymized case summary processing is complete.

Use Cases

Use cases: Business Rules Entry

Let it be assumed that merchant 20 delivers a product to consumer 40. Some products are delivered via a shipper, such as clothing or other goods, while other products are delivered via the Internet, such as documents or image files.

Table 2 shows the predefined problem types in disputes system 10, with associated optional problem parameters and the values acceptable for the problem parameters. The "parameter-value" column indicates the nature of the parameter, e.g., textual (TEXT) or numeric (NN), or specific values that may be assumed by the parameter, e.g., "too big" or "too small." At the end of Table 2 are optional problem parameters, "&Product" and "&Feeling", that are actually more akin to descriptions of the problem; these are presented to consumer 40 as questions to answer while describing the problem type.

TABLE 2

| Problem-type | Problem-parameter | Parameter-value |
|---|---|---|
| Not as expected | Size | too big, too small |
| | Color | too dark, too light, didn't match |
| | Version | |
| | Poor quality | materials, workmanship |
| | Text description | TEXT |
| Defective | Damaged upon arrival | |
| | Would not operate properly | |
| | Would not assemble properly | |
| | Problem developed during use | |
| | Text description | TEXT |
| Delivery | Arrived too late | NN days later than expected |
| | Did not arrive | |
| | Downloading problem | |
| | Text description | TEXT |
| Companion product | Problem with companion | |
| | Text description | TEXT |
| Billing problem | Billed for item that didn't arrive | |
| | Billed twice for same item | |
| | Billed for unauthorized add-on | |
| | Discount or coupon not applied | |

TABLE 2-continued

| Problem-type | Problem-parameter | Parameter-value |
|---|---|---|
| | Refund promised but didn't arrive | |
| | Text description | TEXT |
| Unwanted gift | Text description | TEXT |
| Other | Text description | TEXT |
| &Product-info | Item cost | NN |
| | Delivery cost | NN |
| | Tax cost | NN |
| | Other cost | NN |
| | Purchase date | DATE |
| | Scheduled delivery date | DATE |
| | Actual delivery date | DATE |
| | Item sold-as status | new, irreg., used, as-is |
| | Item sales price status | regular, sale |
| | Item order no. | NN |
| | Item SKU no. | NN |
| | Item description | TEXT |
| | Item quantity | NN |
| | Item sales channel | store, mail order, internet |
| &Feeling-problem | summary | confident-of-resolution, frustrated, disappointed, embarrassed |
| | Text description | TEXT |

The term SKU is an acronym for stock-keeping unit.

Table 3 shows the predefined solution types in disputes system 10, with associated optional solution parameters and the values acceptable for the solution parameters. A business rule cannot specify "other" as a solution; the "other" solution type can be specified only by a consumer during complaint preparation. If the customer's only desired solution is "other", then none of the business rules will provide a matching solution and the case will go to automated mediation. At the end of Table 3 are optional solution parameters, "&Bonus" and "&Feeling" that enhance information flow between consumer 40 and merchant 20.

TABLE 3

| Solution-Type | Solution-parameter | Parameter-value |
|---|---|---|
| Refund | payment method | original, different |
| | shipping to consumer | will refund, won't refund |
| | return shipping from consumer | will refund, won't refund |
| | text message | TEXT |
| Store credit | text message | TEXT |
| Exchange for another item | return shipping from consumer | will refund, won't refund |
| | discount on additional purchases | NN% |
| | text message | TEXT |
| Repair | describe desired repair | TEXT |
| | text message | TEXT |
| Other | describe | TEXT |
| | text message | TEXT |
| &Bonus | coupon for n% off next purchase | NN |
| | free gift as apology | |
| | text message | TEXT |
| &Feeling-Solution | summary | |
| | text description | TEXT |
| | text message | TEXT |

Let merchants 21 and 22 be coupled to disputes system 10 in similar manner as merchant 20. Let the automated complaints policies for merchants 20-22 be as shown in Table 4. Merchants may adopt any policy or exceptions they wish during automated mediation. Table 4 also shows the rules required by disputes system 10, considered as an affiliated organization.

TABLE 4

| | Merchant complaints policy |
|---|---|
| Merchant 20 | Exchange within 30 days of purchase for another item or store credit for up to one year. If defective, will provide refund, credit or exchange but not repair. |
| Merchant 21 | Will refund or exchange or provide store credit if the item cost was under $100 or the item was purchased within the last 30 days, and will not pay for return shipping. Otherwise, will exchange or provide store credit. If defective, will exchange and will pay for return shipping. |
| Merchant 22 | Do whatever the customer wants, will pay for the customer's shipping and return shipping. If customer exchanges for item of higher value, give 10% discount on higher valued item. If defective, do whatever the customer wants and provide free gift. |
| Disputes system 10 | Must collect item description, item quantity, item value, purchase date, item sales channel, how customer feels about problem with text description, how customer feels about their desired solutions with text description. |

Table 5 shows the rule sets generated after each of merchants 20-22 has entered rules according to the procedure shown in FIG. 4E.

TABLE 5

| | Automated complaints policy |
|---|---|
| Merchant 20 | 1. If ( (not-as-expec or delivery or companion) & ((today-date − purchase-date) ≦ 30 ) )<br>then ( (exchange & (return-shipping = won't refund))<br>    or (credit & (text-message = "Good for one year")<br>        & (return-shipping = won't refund))<br>)<br>2. If (defective)<br>then ((refund or credit or exchange) & (return-shipping = will refund)<br>)<br>PREC: exchange > credit > refund > repair |
| Merchant 21 | 1. If ((not-as-expec or delivery or companion) & ( ((today-date − purchase-date) ≦ 30) or (item-cost ≦ 100) ) )<br>then ((refund or credit or exchange) & (return-shipping = won't refund)<br>)<br>2. If (not-as-expec or delivery or companion)<br>then ((credit or exchange) & (return-shipping = won't refund)<br>)<br>3. If (defective) then (exchange & (return-shipping = will refund)<br>PREC: refund > credit > exchange > repair |
| Merchant 22 | 1. If (*)<br>then ( (refund<br>    or credit<br>    or (exchange & bonus = "10% off higher value exchange item")<br>    or repair)<br>    & (shipping-to-consumer = will refund)<br>    & (return-shipping = will refund)<br>)<br>2. If (defective)<br>then ( (refund or credit or exchange or repair)<br>    & (shipping-to-consumer = will refund)<br>    & (return-shipping = will refund)<br>    & (bonus = free gift)<br>)<br>PREC: exchange > refund > repair > credit |

TABLE 5-continued

| | Automated complaints policy |
|---|---|
| Disputes system 10 | 1. If (item-cost & purchase-date & sales-channel & feeling-problem)<br>then (feeling-solution) |

Disputes system 10 may offer merchants predefined complaints policy sets, such as those shown in Table 5, which can be modified by the merchant. When a merchant chooses a predefined complaints policy set with no modifications, the merchant need not go through the detailed rules entry procedure shown in FIG. 4E.

Use cases: Consumer Complaint Preparation

Let consumers 41 and 42 be coupled to disputes system 10 in similar manner as consumer 40. Assume that the consumers' complaints are as shown in Table 6

TABLE 6

| | Consumer complaints |
|---|---|
| Consumer 40 | Bought two lamps for $400 each two weeks ago, and wants a refund |
| Consumer 41 | Bought a sweater for $90 20 days ago, wants to exchange it for a different size and color |
| Consumer 42 | Bought a custom astrology report for $20, but it wasn't as in-depth as expected, so wants refund. |

During preparation of a well-formed complaint for each consumer, disputes system 10 collects all information needed to determine whether the automated rules for a merchant apply, including all problem-parameters in a merchant's business rules, and all information required by an affiliated organization, including the information required by disputes system 10.

One type of information required by disputes system 10 is how the customer feels about the problem. In one embodiment, disputes system 10 presents a menu of feeling adjectives, such as: "happy, hopeful, confident, confused, disappointed, frustrated, angry," to the consumer, and the consumer selects at least one feeling from the menu. Additionally, disputes system 10 presents a free form text entry area to the consumer, and requests that the consumer provide more detail on their feelings. Disputes system 10 uses lexical and syntactical analysis of the consumer's detailed feeling information to select one or more feeling summary statements, and then presents the summary statements to the consumer as a reflection of their feelings. The consumer either approves the summary or modifies it and then approves the modified summary. Modification can be directly, such as by editing the summary, or indirectly, such as by providing more feeling explanation that is used by disputes system 10 to customize the words in the summary.

For example, assume consumer 42 selects "disappointed" and provides the following emotional detail information:

"This was a lousy report. I thought it would give daily forecasts and all I got was mumbo jumbo. I was gypped!"

Disputes system 10 uses the emotional detail information to generate the following emotional state information:

"You feel the report is poor quality. Is this right?"More specifically, disputes system 10 compares the item description, an astrology report, with the detail text to identify "ITEM=report" in the detail text. Disputes system 10 extracts "lousy" as an ADJECTIVE for ITEM, then uses its dictionary to find "poor quality" as a synonym. Finally, disputes system 10 selects the summary template, "You felt the ITEM was ADJECTIVE", and inserts the specific values for the item and synonym. Conventional e-mail processing systems use various lexical and syntactical analysis techniques to "understand" natural language. Consumer 42 then indicates their approval of the generated emotional state.

When disputes system 10 detects that the consumer has indicated only one type of solution is acceptable, disputes system 10 prompts the consumer to select at least two types of solutions to improve the chances of resolving this complaint. In some embodiments, disputes system 10 uses the applicable business rules to suggest which type(s) of solutions should be selected by the consumer. In alternative dispute resolution terminology, such interaction is referred to as "assisted negotiation."

After automated complaint preparation the well-formed complaints are as shown in Table 7.

TABLE 7

| | Well-formed complaints | |
|---|---|---|
| Consumer 40 | consumer ID | 40 |
| | merchant ID | 20 |
| | complaint filing date | 02/22/01 |
| | problem-type | not as expected |
| | item description | walnut/chrome floor lamps |
| | item quantity | 2 |
| | item-cost | $800 |
| | purchase-date | 02/15/01 |
| | sales-channel | store |
| | feeling-problem | frustrated, wants to be treated fairly |
| | solution-type | refund |
| | feeling-solution | entitled, store clerk promised refund |
| Consumer 41 | consumer ID | 41 |
| | merchant ID | 21 |
| | complaint filing date | 02/22/01 |
| | problem-type | not-as-expected |
| | item description | Peruvian pullover sweater |
| | item quantity | 1 |
| | item-cost | $90 |
| | purchase-date | 02/02/01 |
| | sales-channel | mail order |
| | feeling-problem | disappointed, loves item but wants proper fit |
| | solution-type | exchange or refund |
| | feeling-solution | hopeful, see above |
| Consumer 42 | consumer ID | 42 |
| | merchant ID | 22 |
| | complaint filing date | 02/22/01 |
| | problem-type | defective |
| | item description | 3 month astrology report |
| | item quantity | 1 |
| | item-cost | $20 |
| | purchase-date | 02/22/01 |
| | sales-channel | Internet |
| | feeling-problem | disappointed, report is poor quality |
| | solution-type | refund or exchange |
| | feeling-solution | entitled & hopeful, want case to be quickly resolved |

Use cases: Compare Complaint with Business Rules

Table 8 shows the result of comparing the well-formed complaints in Table 7 with the rules in Table 5. When a consumer has specified multiple acceptable types of solutions, the precedence ordering of the business rules is used to select the solution most favored by the merchant. Disputes system 10 would actually compare the complaint only with the rules for the merchant named in the complaint, that is the complaint for consumers 40, 41, 42 with the rules for merchants 20, 21, 22, respectively.

TABLE 8

| | Merchant 20 | Merchant 21 | Merchant 22 |
|---|---|---|---|
| Consumer 40 | NO MATCH | exchange | refund & (shipping-to-consumer = will refund) & (return-shipping = will refund) |
| Consumer 41 | refund | refund | exchange & bonus = "10% off higher value exchange item" & (shipping-to-consumer = will refund) & (return-shipping = will refund) |
| Consumer 42 | exchange & (return-shipping = will refund) | refund | exchange & (shipping-to-consumer = will refund) & (return-shipping = will refund) & bonus = free gift |

In the case of consumer 40's complaint against merchant 20, disputes system 10 detects that there is no match between the consumer's desired solution and the business rules applicable to the consumer's situation as set forth in the well-formed complaint. Accordingly, this case proceeds to automated mediation. Since one of the business rules applies to the consumer's situation, disputes system 10 uses the solutions in the applicable business rule to generate merchant 20's Answer to consumer 40's Complaint:
    exchange & (return-shipping=won't refund))
    or
    credit & (text-message="Good for one year")
      & (return-shipping=won't refund)

In all other cases, disputes system 10 automatically resolves the consumer's complaint because there is a match between the consumer's desired solution and the business rules applicable to the consumer's situation as set forth in the well-formed complaint. In some cases, there are multiple matches, and the merchant's precedence ordering is used to select the type of solution in the automatic resolution.

Use cases: Automated Mediation

For the complaint from consumer 40 against merchant 20, disputes system 10 prepares a well-formed Answer via FIG. 8A steps 715 and 720. Table 9 shows the well-formed Answer; the left-hand column is provided for the convenience of the reader, that is, the well-formed Answer does not include the left-hand column.

TABLE 9

| | Well-formed Answer |
|---|---|
| Automatically generated Answer | Case: 567832<br>Date Answer sent: 02/22/01<br>ANSWER<br>FROM MERCHANT 20 TO COMPLAINT FROM CONSUMER 40<br>Thank you for using this system to resolve your complaint.<br>The complaint handling policy of merchant 20 does not match your desired solution, a REFUND. However, merchant 20 is agreeable to either of the following solutions:<br>    (1) an EXCHANGE, or<br>    (2) a STORE CREDIT Good for one year |

TABLE 9-continued

Well-formed Answer

|   |   |
|---|---|
|   | If you accept solution (1), please reply to this email with "accept (1)" as the first line of the message, and keeping the same subject line.<br>If you accept solution (2), please reply to this email with "accept (2)" as the first line of the message, and keeping the same subject line.<br>If you do not accept these solutions, please go to the following address and use the system to prepare your Reply:<br>http://www.automatedsystem.com/cgi/?PrepareReply&case=567832<br>Or, you can go to web site 12, access your pending cases, and prepare your Reply from there.<br>YOU MUST REPLY WITHIN TWO WEEKS OF TODAY, by March 8, 2001. If you do not reply by this date, you are ABANDONING your complaint, and the public record for merchant 20 will reflect that your complaint was SUCCESSFULLY RESOLVED. |
| Merchant-Text-4 | This is a form message from merchant 20: Please be aware that the above text was automatically created by the system based on my rules. Your satisfaction is important to me, and I hope this takes care of your problem. |

Assume that consumer 40 still wants a refund, so consumer 40 goes to web site 12 and prepares a Reply by interacting with disputes system 10 operative according to FIG. 8C. Table 10 shows the well-formed Reply approved by consumer 40 for sending to merchant 20 as an e-mail message.

TABLE 10

Well-formed Reply

Case: 567832
Date Reply sent: 02/24/01
REPLY
FROM CONSUMER 40 TO MERCHANT 20
Thank you for answering my complaint (see copy below).
I appreciate your offer of an EXCHANGE, or a STORE CREDIT Good for one year.
However, I wish to have a REFUND. I think this is fair because "your clerk, the blond guy about 25 years old, told me that I could bring it back if I didn't like it".

TABLE 10-continued

Well-formed Reply

I feel frustrated and angry, and want to be treated fairly and have this problem resolved.
If you accept my solution of a REFUND, please reply to this email with "accept" as the first line of the message, and keeping the same subject line.
If you do not accept my solution, please go to the following address and use the system to prepare your Sur-reply:
http://www.automatedsystem.com/cgi/?PrepareSurreply&case=567832
Or, you can go to web site 12, access your pending cases, and prepare your Sur-reply from there.
YOU MUST SUR-REPLY WITHIN TWO WEEKS OF TODAY, by March 10, 2001. If you do not sur-reply by this date, you are NON-RESPONSIVE, and your public record will reflect that you DID NOT RESPOND to a complaint.

| COMPLAINT | |
|---|---|
| consumer ID | 40 |
| merchant ID | 20 |
| complaint filing date | 02/22/01 |
| problem-type | not as expected |
| item description | walnut/chrome floor lamps |
| item quantity | 2 |
| item-cost | $800 |
| purchase-date | 02/15/01 |
| sales-channel | store |
| feeling-problem | frustrated, wants to be treated fairly |
| solution-type | refund |
| feeling-solution | entitled, store clerk promised refund |

Merchant 20 receives the well-formed Reply shown in Table 10; this is the first time in this case that merchant 20 has had a human involved in resolution of this complaint. Disputes system 10 has collected the complaint information for merchant 20, and automatically answered the complaint according to merchant 20's automated complaint handling policy. Disputes system 10 has enabled consumer 40 to vent his or her emotions without any stress to merchant 20. By including emotional state information in each communication from consumer 40, disputes system 10 provides merchant 20 with a snapshot of how consumer 40 feels, despite no personal involvement from merchant 20.

Assume that merchant 20 does not wish to make an exception to its policy and provide a refund, but realizes that consumer 40 is stuck on receiving a refund. Accordingly, merchant 20 uses web site 12 to prepare a well-formed Sur-reply, shown in Table 11, and send it to consumer 40 via e-mail.

TABLE 11

Well-formed Sur-reply

Case: 567832
Date Sur-Reply sent: 02/27/01
SUR-REPLY
FROM MERCHANT 20 TO COMPLAINT FROM CONSUMER 40
Thank you for using this system to resolve your complaint
I understand that you want a REFUND, and want to be treated fairly and have this problem resolved.
I offer the following CUSTOM solution to your complaint:
    "You can have a store credit good for one year. If you use the
    store credit, you can have 25% off whatever you purchase as long
    as it is at least the value of your original purchase. If you don't use
    the store credit, at the end of the year, you can remind me about
    this and I will refund your purchase price."
If you accept my CUSTOM solution, please reply to this email with "accept" as the first line of the message, and keeping the same subject line.
If you do not accept my solution, please go to the following address and use the system to indicate that you do not accept, and view your alternatives at this point:
http://www.automatedsystem.com/cgi/?SurreplyResponse&case=567832
Or, you can go to web site 12, access your pending cases, and respond to my Sur-reply from there.

TABLE 11-continued

Well-formed Sur-reply

Case: 567832
Date Sur-Reply sent: 02/27/01

SUR-REPLY
FROM MERCHANT 20 TO COMPLAINT FROM CONSUMER 40

YOU MUST RESPOND WITHIN TWO WEEKS OF TODAY, by March 13, 2001. If you do not respond by this date, you are ABANDONING your complaint, and the public record for merchant 20 will reflect that your complaint was SUCCESSFULLY RESOLVED.

Assume that consumer 40 accepts the custom solution offered by merchant 20. Disputes system 10 then notifies consumer 40 and merchant 20 that an agreement has been reached, and that consumer 40 should return the item by a specific date, such as Mar. 30, 2001, and that merchant 20 must act on its custom solution, herein, issue the credit, within two weeks after the date that the item is returned.

Following the compliance procedure shown in FIG. 9, disputes system 10 obtains an e-mail affirmation from consumer 40 that the item has been returned. Merchant 20 confirms that the item was returned and affirms that the store credit was issued. Consumer 40 confirms that the store credit was received. The complaint has been successfully resolved, and disputes system 10 closes the case.

Use cases: Prepare Anonymized Case Summary

After a case is closed, disputes system 10 prepares an anonymized summary of the case and archives the detailed case record. Assume the demographic information from consumer 40's registration 210 is as shown in Table 12, the demographic information from merchant 20's registration 220 is as shown in Table 13, and the case record is as shown in Table 14. Assume that the population of Evanston is 80,000 and the population of Atlanta is 1,200,000. Disputes system 10 prepares the anonymized case summary shown in Table 15.

TABLE 12

Consumer Demographic Information

| | |
|---|---|
| consumer ID | 40 |
| residence | Evanston, Illinois |
| dwelling unit | own house |
| sex | F |
| birth year | 1960 |
| income | $72,000 |
| marital status | divorced |
| household size | 3 |

TABLE 13

Merchant Demographic Information

| | |
|---|---|
| merchant ID | 20 |
| location | Atlanta, Georgia |
| no. employees | 22 |
| in business since | 1998 |
| industry category | retail |
| revenue | $6,000,000 |
| no. stores | 4 |
| mail order sales | yes |
| Internet sales | yes |

TABLE 14 case record

| | | |
|---|---|---|
| case ID | 567832 | |
| filing date | 2/22/01 | |
| consumer ID | 40 | |
| merchant ID | 20 | |
| complaint | consumer ID | 40 |
| | merchant ID | 20 |
| | complaint filing date | 02/22/01 |
| | problem-type | not as expected |
| | item description | walnut/chrome floor lamps |
| | item quantity | 2 |
| | item-cost | $800 |
| | purchase-date | 02/15/01 |
| | sales-channel | store |
| | feeling-problem | frustrated, wants to be treated fairly |
| | solution-type | refund |
| | feeling-solution | entitled, store clerk promised refund |
| business rules at start of case | 1. If ( (not-as-expec or delivery or companion)    & ((today-date - purchase-date) ≦ 30) ) then ( (exchange & (return-shipping = won't refund))    or (credit & (text-message = "Good for one year")       & (return-shipping = won't refund)) ) | |

TABLE 14-continued

| | case record |
|---|---|
| | 2. If (defective)<br>then ((refund or credit or exchange) & (return-shipping = will refund)<br>)<br>PREC: exchange > credit > refund > repair |
| system version | v2001.3 |
| procedural - Answer | prepared by system on 2/22/01 |
| Answer attached | ANSWER<br>FROM MERCHANT 20 TO COMPLAINT FROM CONSUMER 40<br>Thank you for using this system to resolve your complaint.<br>The complaint handling policy of merchant 20 does not match your<br>desired solution, a REFUND. However, merchant 20 is agreeable to<br>either of the following solutions:<br>    (3) an EXCHANGE, or<br>    (4) '[<br>    (5) a STORE CREDIT Good for one year<br>If you accept solution (1), please reply to this email with "accept (1)" as<br>the first line of the message, and keeping the same subject line.<br>If you accept solution (2), please reply to this email with "accept (2)" as<br>the first line of the message, and keeping the same subject line.<br>If you do not accept these solutions, please go to the following address<br>and use the system to prepare your Reply:<br>http://www.automatedsystem.com/cgi/?PrepareReply&case=567832<br>Or, you can go to web site 12, access your pending cases, and prepare<br>your Reply from there.<br>YOU MUST REPLY WITHIN TWO WEEKS OF TODAY, by March<br>8, 2001. If you do not reply by this date, you are ABANDONING your<br>complaint, and the public record for merchant 20 will reflect that your<br>complaint was SUCCESSFULLY RESOLVED. |
| procedural - Reply | prepared by consumer on 2/24/01 |
| Reply attached | REPLY<br>FROM CONSUMER 40 TO MERCHANT 20<br>Thank you for answering my complaint (see copy below).<br>I appreciate your offer of an EXCHANGE, or a STORE CREDIT Good<br>for one year.<br>However, I wish to have a REFUND. I think this is fair because "your<br>clerk, the blond guy about 25 years old, told me that I could bring it back<br>if I didn't like it".<br>I feel frustrated and angry, and want to be treated fairly and have this<br>problem resolved.<br>If you accept my solution of a REFUND, please reply to this email with<br>"accept" as the first line of the message, and keeping the same subject<br>line.<br>If you do not accept my solution, please go to the following address and<br>use the system to prepare your Sur-reply:<br>http://www.automatedsystem.com/cgi/?PrepareSurreply&case=567832<br>Or, you can go to web site 12, access your pending cases, and prepare<br>your Sur-reply from there.<br>YOU MUST SUR-REPLY WITHIN TWO WEEKS OF TODAY, by<br>March 10, 2001. If you do not sur-reply by this date, you are NON-<br>RESPONSIVE, and your public record will reflect that you DID NOT<br>RESPOND to a complaint. |
| procedural - Sur-<br>reply | prepared by merchant on 2/27/01 |
| Sur-reply attached | SUR-REPLY<br>   FROM MERCHANT 20 TO COMPLAINT FROM CONSUMER 40<br>Thank you for using this system to resolve your complaint<br>I understand that you want a REFUND, and want to be treated fairly and<br>have this problem resolved.<br>I offer the following CUSTOM solution to your complaint:<br>      "You can have a store credit good for one<br>      year. If you use the store credit, you can<br>      have 25% off whatever you purchase as<br>      long as it is at least the value of your<br>      original purchase. If you don't use the<br>      store credit, at the end of the year, you can<br>      remind me about this and I will refund<br>      your purchase price."<br>If you accept my CUSTOM solution, please reply to this email with<br>"accept" as the first line of the message, and keeping the same subject<br>line.<br>If you do not accept my solution, please go to the following address and<br>use the system to indicate that you do not accept, and view your<br>alternatives at this point:<br>http://www.automatedsystem.com/cgi/?SurreplyResponse&case=567832<br>Or, you can go to web site 12, access your pending cases, and respond to<br>my Sur-reply from there.<br>YOU MUST RESPOND WITHIN TWO WEEKS OF TODAY, by |

TABLE 14-continued

| | case record |
|---|---|
| | March 13, 2001. If you do not respond by this date, you are ABANDONING your complaint, and the public record for merchant 20 will reflect that your complaint was SUCCESSFULLY RESOLVED. |
| procedural - Sur-reply Decision | prepared by consumer on 3/1/01, agreement reached |
| Sur-reply Decision attached | accept |
| Compliance - Consumer | consumer affirmed 3/5/01 merchant confirmed 3/8/01 |
| Compliance - Merchant | merchant affirmed 3/8/01 consumer confirmed 3/22/01 |
| Status | Complaint successfully resolved |

TABLE 15

| | | Anonymized case summary | |
|---|---|---|---|
| case ID | 567832 | | |
| consumer demographic Level I | city | 50,000-100,000 | |
| | dwelling unit | own | |
| | sex | F | |
| | age | 30-35 | |
| | income | $50,000-75,000 | |
| | marital status | single (includes divorced, widowed) | |
| | household size | 2-5 | |
| consumer demographic Level II | city | Evanston, Illinois | |
| | dwelling unit | own house | |
| | sex | F | |
| | age | 1960 | |
| | income | $72,000 | |
| | marital status | divorced | |
| | household size | 3 | |
| merchant demographic Level I | location | 1,000,000-5,000,000 | |
| | no. employees | 10-50 | |
| | years in business | 4-10 | |
| | industry category | retail | |
| | revenue | $1,000,000- 10,000,000 | |
| | stores | yes | |
| | mail order sales | yes | |
| | Internet sales | yes | |
| merchant demographic Level II | location | Atlanta, Georgia | |
| | no. employees | 22 | |
| | years in business | 4 | |
| | industry category | retail | |
| | revenue | $6,000,000 | |
| | no. stores | 4 | |
| | mail order sales | yes | |
| | Internet sales | yes | |
| procedural history Level I | Complaint | filing date | 02/01 |
| | | problem-type | not as expected |
| | | item | product |
| | | item-cost | $500-1,000 |
| | | purchase-date | filing - (up to 1 week) |
| | | sales channel | store |
| | | problem-feeling | frustrated |
| | | solution | refund |
| | | solution-feeling | entitled |
| | Answer | date | filing |
| | | solution | exhange or credit |
| | Reply | date | filing + (1-3 days) |
| | | solution | refund |
| | Sur-Reply | date | filing + (4-7 days) |
| | | solution | custom |
| | Sur-Reply Decision | date | filing + (4-7 days) |
| | | type | accept |
| | Compliance | yes | |
| | Status | complaint successfully resolved | |
| procedural history Level II | Complaint | filing date | 02/22/01 |
| | | problem-type | not as expected |
| | | item | lamp |
| | | item-cost | $800 |
| | | purchase-date | filing - 7 days |
| | | sales-channel | store |
| | | problem-feeling | frustrated |

TABLE 15-continued

| | | Anonymized case summary | |
|---|---|---|---|
| | Answer | solution | refund |
| | | solution-feeling | entitled |
| | | date | filing + 0 days |
| | | generated by | system |
| | | solution | exchange or credit |
| | Reply | date | filing + 2 days |
| | | solution | refund |
| | | solution-feeling | frustrated, angry |
| | Sur-Reply | date | filing + 5 days |
| | | solution | custom, store credit, refund |
| | Sur-Reply | date | filing + 7 days |
| | Decision | type | accept |
| | Compliance | consumer date | filing + 11 days |
| | | cons'r affirmed by | consumer |
| | | merchant date | filing + 14 days |
| | | merch. affirmed by | merchant |
| | Status | | complaint successfully resolved |
| resolution description Level I | custom | | |
| resolution description Level II | consumer merchant | | return item, no return shipping custom, store credit, refund |

Disputes system 10 also provides an interface (not shown) for each registered member, consumers and merchants, to update their registration information and manage their complaints.

In some embodiments, disputes system 10 provides an interface for human-directed dispute resolvers to manage their pending case referrals.

In some embodiments, disputes system 10 also provides a marketplace for human-directed dispute resolution services to bid on cases based on the nature of the case, how far apart the parties are in their negotiating positions and other suitable parameters. More specifically, dispute resolvers register with disputes system 10 to receive synopses of cases desiring mediation, and submit bids of how quickly they can take the case and/or their fee for mediating the case. Disputes system 10 uses a predetermined procedure to select the dispute resolver, such as high bidder subject to veto by one of the parties, or other procedure.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for automated resolution of a complaint from a complainer against a respondent, the complaint having a desired remedy, comprising:

receiving, at a computer, emotional detail information from the complainer, summarizing, at the computer, the emotional detail information to generate emotional state information for the complaint, comparing, at the computer, the desired remedy with business rules previously supplied by the respondent to detect whether there is a match between the desired remedy and solutions that the respondent agrees to, at least one of the business rules depending on the emotional state information.

2. A method of claim 1, further comprising:

obtaining, at a computer, an agreement resolving the complaint, the agreement being voluntarily entered into between the complainer and respondent and not being a judgment from an entity other than the complainer or the respondent, and monitoring, at the computer, compliance by at least one of the complainer and the respondent with terms of the agreement, wherein monitoring compliance includes receiving, at the computer, compliance information from at least one of the complainer and the respondent.

3. A method of claim 1, further comprising:

obtaining, at a computer, an agreement resolving the complaint, the agreement being voluntarily entered into between the complainer and respondent and not being a judgment from an entity other than the complainer or the respondent, and monitoring, at the computer, compliance by at least one of the complainer and the respondent with terms of the agreement, wherein monitoring compliance includes receiving, at the computer, compliance information from an external source.

4. The method of claim 1, wherein the summarizing includes extracting an adjective from the emotional detail information, looking up a synonym in accordance with the extracted adjective, and inserting the synonym into a summary template to generate the emotional state information.

5. A method for automated resolution of a complaint from a complainer against a respondent, the complaint having a desired remedy, comprising:

comparing, at a computer, the desired remedy with business rules previously defined by the respondent to generate a comparison, detecting, at the computer, lack of agreement between the complainer and the respondent based on the comparison, and at the computer, performing a procedure to enable the respondent to create a first response for the complainer, and again performing the procedure to enable the complainer to create a second response for the respondent, wherein the procedure includes:
(a) providing at least two of historical information, advisory information and contra-party current position information to a response creator, the response creator being one of the complainer and respondent, the contra-party being the other of the complainer and respondent,
(b) suggesting a solution to the response creator when the response creator does not agree with a desired outcome identified in the contra-party current position,
(c) receiving input from the response creator in response to the suggested solution,
(d) preparing a draft response including at least predefined parameters based on the received input,
(e) displaying the draft response to the response creator,
(f) receiving an approval of the draft response from the response creator, and
(g) sending the approved draft response as the response from the response creator to the contra-party,
wherein the input from the response creator includes emotional detail information and the draft response includes emotional state information.

6. The method of claim 5, further comprising automatically monitoring compliance by at least one of the complainer and the respondent with terms of an agreement resolving the complaint.

7. The method of claim 6, wherein automatically monitoring compliance includes receiving compliance information from at least one of the complainer and the respondent.

8. The method of claim 6, wherein automatically monitoring compliance includes receiving compliance information from an external source.

9. The method of claim 5, further comprising automatically preparing a summary of processing of the complaint.

10. The method of claim 9, wherein the summary is anonymized.

11. The method of claim 9, wherein the summary has at least two levels of information granularity.

12. A method for automated resolution of a complaint from a complainer against a respondent, the complaint having a desired remedy, comprising:
comparing, at a computer, the desired remedy with business rules previously defined by the respondent to generate a comparison,
detecting, at the computer, lack of agreement between the complainer and the respondent based on the comparison,
at the computer, performing a procedure to enable the respondent to create a first response for the complainer, and again performing the procedure to enable the complainer to create a second response for the respondent, wherein the procedure includes:
(a) providing at least two of historical information, advisory information and contra-party current position information to a response creator, the response creator being one of the complainer and respondent, the contra-party being the other of the complainer and respondent,
(b) suggesting a solution to the response creator when the response creator does not agree with a desired outcome identified in the contra-party current position,
(c) receiving input from the response creator in response to the suggested solution,
(d) preparing a draft response including at least predefined parameters based on the received input,
(e) displaying the draft response to the response creator,
(f) receiving an approval of the draft response from the response creator, and
(g) sending the approved draft response as the response from the response creator to the contra-party,
receiving, at the computer emotional detail information from the complainer, and
generating, at the computer, emotional state information for the complaint that summarizes the emotional detail information.

13. The method of claim 12, further comprising presenting relevant contextual information to the complainer during preparation of the complaint.

14. The method of claim 13, wherein the relevant contextual information is based on a set of advisory rules.

15. The method of claim 12, further comprising automatically determining what information is needed to detect lack of agreement based on information previously supplied by the respondent, and automatically collecting the needed information.

16. The method of claim 15, wherein the previously supplied information includes values for parameters relating to the complainer or to a subject of the complaint.

17. The method of claim 12, further comprising automatically generating the respondent's answer to the complaint.

18. The method of claim 17, wherein generating the respondent's answer to the complaint occurs when the complaint's desired solution does not match acceptable solutions specified in the business rules of the respondent.

19. The method of claim 12, wherein the generating includes
extracting an adjective from the emotional detail information,
looking up a synonym in accordance with the extracted adjective, and
inserting the synonym into a summary template to generate the emotional state information.

* * * * *